US012671893B2

(12) United States Patent
He et al.

(10) Patent No.: US 12,671,893 B2
(45) Date of Patent: Jun. 30, 2026

(54) GENERATING IMAGE CONTENT

(71) Applicant: QUALCOMM Incorporated, San Diego, CA (US)

(72) Inventors: Kai He, San Diego, CA (US); Hau Hwang, San Diego, CA (US); Sandesh Ghimire, San Diego, CA (US); Meng-Lin Wu, San Diego, CA (US); Venkata Ravi Kiran Dayana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 18/469,398

(22) Filed: Sep. 18, 2023

(65) Prior Publication Data

US 2025/0097566 A1      Mar. 20, 2025

(51) Int. Cl.
*H04N 23/63* (2023.01)
*H04N 5/262* (2006.01)
*H04N 23/62* (2023.01)

(52) U.S. Cl.
CPC ......... *H04N 23/632* (2023.01); *H04N 5/2628* (2013.01); *H04N 23/62* (2023.01); *H04N 23/635* (2023.01)

(58) Field of Classification Search
CPC .... G06T 3/4046; G06N 3/0475; G06N 3/017; G06N 3/04845; G06F 3/0488; H04N 23/635; H04N 23/62; H04N 23/632; H04N 5/2628
USPC ................................................... 348/333.03
See application file for complete search history.

(56) References Cited

U.S. PATENT DOCUMENTS

| | | | |
|---|---|---|---|
| 10,614,557 B2 | 4/2020 | Lin et al. | |
| 10,769,495 B2 * | 9/2020 | Bui | G06F 9/451 |
| 10,930,054 B2 | 2/2021 | Zhang | |
| 11,475,650 B2 * | 10/2022 | Berliner | G06F 3/0304 |
| 11,972,522 B2 * | 4/2024 | Chui | G06T 5/50 |
| 12,056,903 B2 * | 8/2024 | Sima | G06V 10/44 |

(Continued)

FOREIGN PATENT DOCUMENTS

| CN | 113177891 A | 7/2021 |
|---|---|---|
| EP | 3699736 A1 | 8/2020 |

OTHER PUBLICATIONS

Adobe: "Using Adobe Photoshop CS5", Jan. 1, 2011, XP055320718, 639 Pages, section Viewing images, chapter 6, p. 2-p. 21.

(Continued)

*Primary Examiner* — Pritham D Prabhakher
(74) *Attorney, Agent, or Firm* — QUALCOMM Incorporated

(57) ABSTRACT

Systems and techniques are described herein for generating image content. For instance, an apparatus for generating image content is provided. The method may include a user interface configured to: display an image of a field of view; and receive a user input indicative of a desired change to the image, wherein the desired change to the image comprises a change to the field of view; and at least one processor configured to: provide at least part of the image and an indication of the desired change as inputs to a generative machine-learning model; obtain an altered image from the generative machine-learning model, wherein the altered image comprises at least part of the image of the field of view and generated pixels outside of the field of view.

28 Claims, 18 Drawing Sheets

(56) References Cited

U.S. PATENT DOCUMENTS

| | | | | |
|---|---|---|---|---|
| 12,094,070 | B2 * | 9/2024 | Terre | G06F 3/04815 |
| 12,315,071 | B1 * | 5/2025 | Johnson | G06T 19/20 |
| 12,322,065 | B2 * | 6/2025 | Yu | G06T 5/00 |
| 12,361,519 | B2 * | 7/2025 | Martin Brualla | G06T 5/50 |
| 12,367,546 | B2 * | 7/2025 | Pardeshi | G06T 1/20 |
| 2015/0015504 | A1 * | 1/2015 | Lee | G06F 3/017 |
| | | | | 345/173 |
| 2019/0114748 | A1 * | 4/2019 | Lin | G06T 5/77 |
| 2019/0304164 | A1 * | 10/2019 | Zhang | G06T 1/20 |
| 2020/0042286 | A1 * | 2/2020 | Bui | G06N 3/08 |
| 2020/0226714 | A1 * | 7/2020 | Duan | G06T 11/60 |
| 2020/0302579 | A1 * | 9/2020 | Eisenmann | G06T 5/77 |
| 2021/0118219 | A1 * | 4/2021 | Chui | G06T 17/00 |
| 2021/0192684 | A1 | 6/2021 | Pardeshi et al. | |
| 2022/0254120 | A1 * | 8/2022 | Berliner | G06F 3/011 |
| 2022/0398705 | A1 | 12/2022 | Martin Brualla et al. | |
| 2023/0018309 | A1 * | 1/2023 | Berliner | G09G 5/10 |
| 2023/0153965 | A1 * | 5/2023 | Bai | G06T 3/4053 |
| | | | | 382/254 |
| 2023/0169628 | A1 | 6/2023 | Yu et al. | |
| 2024/0080543 | A1 * | 3/2024 | Manzari | H04N 23/71 |
| 2024/0256218 | A1 * | 8/2024 | Soni | G06F 3/167 |
| 2024/0362758 | A1 * | 10/2024 | Bagnall | G06V 20/70 |

OTHER PUBLICATIONS

He Y., et al., "GlueGAN: Gluing Two Images as a Panorama with Adversarial Learning", 2022 14th International Conference on Intelligent Human-Machine Systems and Cybernetics (IHMSC), IEEE, Aug. 20, 2022, XP034200508, pp. 196-201, The Whole Document.

International Search Report and Written Opinion—PCT/US2024/043760—ISA/EPO—Dec. 16, 2024.

Wafa A., et al., "Light Field GAN-Based View Synthesis Using Full 4D Information", Proceedings of the 23rd International Middleware Conference, Tutorials, ACMPUB27, New York, NY, USA, Dec. 1, 2022, XP058972694, 7 Pages, The Whole Document.

* cited by examiner

GENERATING IMAGE CONTENT

TECHNICAL FIELD

The present disclosure generally relates to image content. For example, aspects of the present disclosure include systems and techniques for generating image content.

BACKGROUND

A camera may focus light (e.g., using a lens) from a scene onto an image sensor and use the image sensor to generate image data based on the sensed light. The camera may, based on a lens of the camera, focus light from a field of view of the scene on to the image sensor. Image data generated by the image sensor may represent the field of view of the camera and not the whole scene.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for generating image content. According to at least one example, an apparatus is provided for generating image content. The apparatus includes: a user interface configured to: display an image of a field of view; and receive a user input indicative of a desired change to the image, wherein the desired change to the image comprises a change to the field of view; and at least one processor configured to: provide at least part of the image and an indication of the desired change as inputs to a generative machine-learning model; obtain an altered image from the generative machine-learning model, wherein the altered image comprises at least part of the image of the field of view and generated pixels outside of the field of view.

In another example, a method for generating image content is provided. The method includes: displaying an image of a field of view at a user interface; receiving, at the user interface, a user input indicative of a desired change to the image, wherein the desired change to the image comprises a change to the field of view; providing at least part of the image and an indication of the desired change as inputs to a generative machine-learning model; and obtaining an altered image from the generative machine-learning model, wherein the altered image comprises at least part of the image of the field of view and generated pixels outside of the field of view.

In another example, an apparatus for generating image content is provided that includes at least one memory and at least one processor (e.g., configured in circuitry) coupled to the at least one memory. The at least one processor configured to: display an image of a field of view at a user interface; receive, at the user interface, a user input indicative of a desired change to the image, wherein the desired change to the image comprises a change to the field of view; provide at least part of the image and an indication of the desired change as inputs to a generative machine-learning model; and obtain an altered image from the generative machine-learning model, wherein the altered image comprises at least part of the image of the field of view and generated pixels outside of the field of view.

In another example, a non-transitory computer-readable medium is provided that has stored thereon instructions that, when executed by one or more processors, cause the one or more processors to: display an image of a field of view at a user interface; receive, at the user interface, a user input indicative of a desired change to the image, wherein the desired change to the image comprises a change to the field of view; provide at least part of the image and an indication of the desired change as inputs to a generative machine-learning model; and obtain an altered image from the generative machine-learning model, wherein the altered image comprises at least part of the image of the field of view and generated pixels outside of the field of view.

In another example, an apparatus for generating image content is provided. The apparatus includes: means for displaying an image of a field of view at a user interface; means for receiving, at the user interface, a user input indicative of a desired change to the image, wherein the desired change to the image comprises a change to the field of view; means for providing at least part of the image and an indication of the desired change as inputs to a generative machine-learning model; and means for obtaining an altered image from the generative machine-learning model, wherein the altered image comprises at least part of the image of the field of view and generated pixels outside of the field of view.

In some aspects, one or more of the apparatuses described herein is, can be part of, or can include a mobile device (e.g., a mobile telephone or so-called "smart phone", a tablet computer, or other type of mobile device), an extended reality device (e.g., a virtual reality (VR) device, an augmented reality (AR) device, or a mixed reality (MR) device), a vehicle (or a computing device, component, or system of a vehicle), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
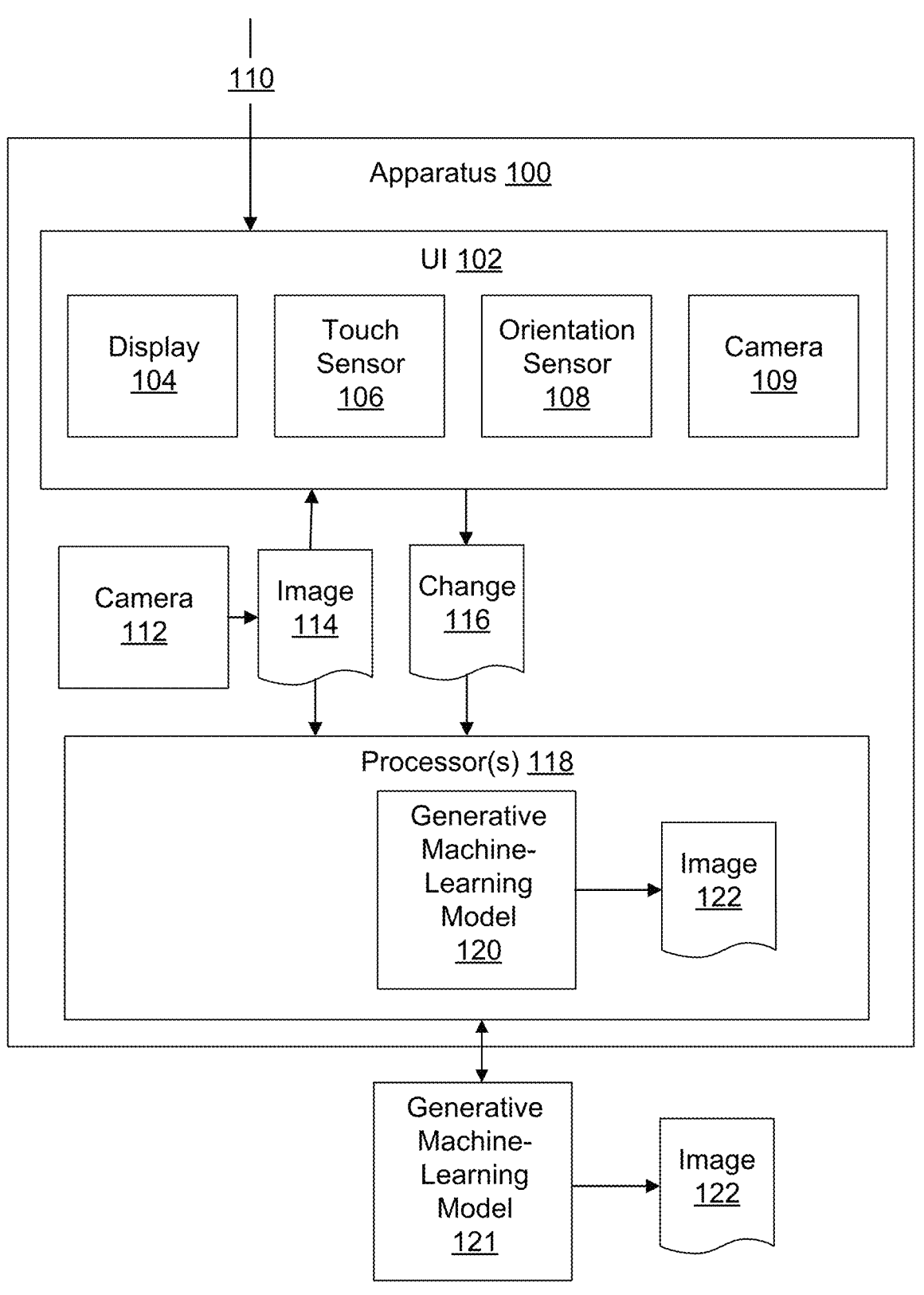
FIG. 1 is a block diagram illustrating an example apparatus for generating image content, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

As described above, a camera may focus light from field of view onto an image sensor and generate image data representative of the field of view of the camera. After the light is sensed and the image data is generated, it may not be possible to change the image by changing the field of view used to capture the image data.

Generative machine-learning models can be trained to generate image data based on provided conditions. Data generation by a generative machine-learning model may be referred to as "hallucination." An image may be provided to a generative machine-learning model as a condition. Image data generated by a generative machine-learning model may be new image data (e.g., based on the training of the generative machine-learning model). The new image data may be conditioned on the provided image but not replicated from the provided image.

Instructing a generative machine-learning model to generate image data can be a cumbersome process. For example, the process of providing an image as a condition for a generative machine-learning model, providing parameters to be used by the generative machine-learning model, and/or instructing the generative machine-learning model what to generate may be a complicated process. For example, there are many different parameters that could be provided to a generative machine-learning model that could impact the generation of the generated image data. Further, there are a number of different ways that the generative machine-learning model may generate the new image data conditioned on the provided image data. Instructing the generative machine-learning model what image data to generate may be cumbersome.

Systems, apparatuses, methods (also referred to as processes), and computer-readable media (collectively referred to herein as "systems and techniques") are described herein for generating image data. The systems and techniques described herein may include a user interface (UI) that may allow a user to generate image data using a generative machine-learning model in an easy and convenient way. For example, the systems and techniques may allow a user to quickly and easily alter an image using a generative machine-learning model (e.g., a diffusion neural network model), such as to alter a field of view of the image. According to some aspects, the systems and techniques may include a user interface that can allow a user to observe a captured image, indicate a desired change to a field of view of the image, and use a generative machine-learning model to generate an altered image based on the desired change.

For example, a user may capture an image of a field of view (e.g., using a camera of a device, such as a mobile phone). The systems and techniques may display the image to the user in a user interface (e.g., in an application on the mobile phone). While displaying the image, the user interface may receive an input from the user indicating a desired change to the field of view of the image. For example, the user may perform a pinch touch gesture (e.g., on a touch screen of the device, such as the mobile phone). The pinch gesture may be a common gesture used to indicate a desire to zoom out from a narrow field of view to a wider field of view. The user interface may interpret the pinch gesture as a desire to expand a field of view of the image. As another example, the user may perform a drag touch gesture (which may be a common gesture used to indicate a desire to pan a field of view in a scene). The user interface may interpret the drag touch gesture as a desire to pan the field of view. As another example, the user may perform a rotating touch gesture (which may be a common gesture used to indicate a desire to rotate an image). The user interface may interpret the rotating touch gesture as a desire to rotate the field of view within a frame of the image. As another example, the user may physically rotate the device including the user interface. For instance, the device may include an orientation sensor that may detect the rotation of the apparatus. The user interface may interpret the rotating of the apparatus as a desire to rotate a frame of the image (e.g., from a landscape frame to a portrait frame or vice versa).

The user interface may provide the image and one or more instructions and/or settings to a generative machine-learning model. For example, the user interface may provide the image to the generative machine-learning model as a condition. Further, the user interface may translate the interpreted desire of the user as one or more instructions, settings, and/or conditions to provide to the generative machine-learning model. For example, based on an interpreted desire to expand the field of view, the user interface may instruct the generative machine-learning model to generate pixels outside the field of view of the image (e.g., on all sides of the field of view of the image). As another example, based on an interpreted desire to pan the field of view, the user interface may instruct the generative machine-learning model to generate pixels outside the field of view of the image (e.g., on one side of the field of view of the image). As another example, based on an interpreted desire to rotate the field of view, the user interface may instruct the generative machine-learning model to generate pixels outside the field of view of the image (e.g., on all sides of the field of view of the image to fill the frame of the image when the field of view is rotated within the frame). As another example, based on an interpreted desire to rotate the frame, the user interface may instruct the generative machine-learning model to generate pixels outside the field of view of the image (e.g., on two sides of the field of view of the image to fill the rotated frame of the image).

Based on the received user input, the generative machine-learning model may be used to generate the image data outside the field of view of an image. Generating data outside a field of view of an image may be referred to as "outpainting." For example, the image may be provided to the generative machine-learning model as a condition and the generative machine-learning model may be instructed, based on the received user input, to generate an altered image including the image of the field of view and generated pixels outside the field of view. For example, the image may be a 1000×1000 pixel image of the field of view. The generative machine-learning model may be instructed to expand the image by generating image data to fill a 2000× 2000 pixel image with the original image of the field of view at the center and newly generated pixel data outside the field of view.

In some cases, such as in cases in which the user desires to rotate the image within the frame, the systems and techniques may rotate the image and crop the altered image to fit the frame. In some cases, the systems and techniques may rotate the image before providing the image to the generative machine-learning model. In other cases, the systems and techniques may rotate the altered image provided by the generative machine-learning model.

In some cases, the systems and techniques may provide the generative machine-learning model with multiple images as conditions for generating image data. For example, the systems and techniques may capture multiple images using multiple cameras at substantially the same time (e.g., a wide-angle camera and an ultra-wide-angle camera of a device, such as a mobile phone). The systems and techniques may provide the multiple captured images to the generative machine-learning model as conditions along with instructions regarding altering one of the images according to the interpreted desire.

As another example, the systems and techniques may obtain multiple images of a scene and provide the multiple images of the scene to the generative machine-learning model as conditions. The systems and techniques may determine that the multiple images are of the same scene based on when the images are captured (e.g., if the images were captured at about the same time, the systems and techniques may assume the images were captured of the same scene), where the images were captured (e.g., if the images were captured at about the same location, which may be determined based on a location and/or positioning service of the device, the systems and techniques may assume that the images were captured of the same scene), and/or by comparing the images. As another example, the systems and techniques my provide an instruction to a user to point the camera around the scene (e.g., while the systems and techniques capture the multiple images) and/or to capture multiple images of the scene so that the systems and techniques may use the multiple images to generate additional pixels.

The systems and techniques, after generating the altered image may display the altered image (or a final image rotated and/or cropped according to the interpreted desire) to the user at the user interface. In some cases, while the generative machine-learning model is generating the altered image, the user interface may display the image surrounded by blurry pixels filling the new frame.

Various aspects of the application will be described with respect to the figures below.

FIG. 1 is a block diagram illustrating an example apparatus 100 for generating image content, according to various aspects of the present disclosure. In general, camera 112 of apparatus 100 may capture image 114. In some aspects, apparatus 100 may obtain image 114 from another source, for example, another computing device may transmit image 114 to apparatus 100 via a communication interface (not illustrated in FIG. 1). Image 114 may represent a field of view of a scene. User interface (UI 102) of apparatus 100 may display image 114 at a display 104 of UI 102. UI 102 may receive a user input 110 indicative of a desired change 116 to image 114 (e.g., at a touch sensor 106 and/or using an orientation sensor 108). The desired change 116 to image 114 may be, or may include, a change to the field of view of image 114. Apparatus 100 may use a generative machine-learning model (e.g., generative machine-learning model 120 and/or generative machine-learning model 121) to generate image 122 (which may include a least a part of image 114 altered according to change 116) in response to user input 110. Apparatus 100 may provide at least a part of image 114 to generative machine-learning model 120 (or generative machine-learning model 121) as a condition. Further, Apparatus 100 may provide instructions to generative machine-learning model 120 (or generative machine-learning model 121) regarding the generation of image 122. The instructions may be based on change 116. Generative machine-learning model 120 (or generative machine-learning model 121) may generate image 122 to include at least a part of image 114 of the field of view and generated pixels outside of the field of view based on the change 116 to the field of view.

Apparatus 100 may be, or may include, any suitable apparatus including a UI 102 and one or more processor(s) 118. For example, apparatus 100 may be a mobile device (e.g., a mobile phone), a camera, a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the operations described with regard to apparatus 100. In some aspects, apparatus 100 may include camera 112 to captured image 114. In other aspects, apparatus 100 may not include camera 112 and image 114 may be obtained from a camera external to apparatus 100.

Camera 112 of apparatus 100 may include an array of photosensors that convert light into image data. Camera 112 may include a lens to focus light from a field of view of a scene onto the array of photosensors. Camera 112 may generate image 114 which may be representative of the field of view, for example, image 114 may include data representative of colors and intensities of light received by the photosensors from the field of view. Image-processing system 1100 of FIG. 11 may be an example of camera 112. In some aspects, apparatus 100 may receive image 114 from another source. For example, apparatus 100 may be receive image 114 via a communications interface.

UI 102 may be, or may include, any suitable means for a user to provide user input 110 to apparatus 100 and for apparatus 100 to provide output to the user (e.g., to display image 114 and/or image 122 to the user). UI 102 may include hardware (e.g., display 104, touch sensor 106, and orientation sensor 108 and/or a camera 109), as well as firmware and/or software to control and interface with the hardware. UI 102 may use display 104 to display images (including image 114 and/or image 122) to the user. UI 102 may use touch sensor 106 to receive user input 110. Touch sensor 106 may be a capacitive touch screen. Touch sensor 106 may be integrated with or layered with display 104, for example, such that a user may provide input relative to image 114. For example, touch sensor 106 may be integrated with display 104 such that the user may touch touch sensor 106 in locations that correspond to points of image 114 as displayed at display 104. In this way, UI 102 may receive input relative to image 114. Additionally or alternatively, UI 102 may use orientation sensor 108 of UI 102 to receive user input 110 based on an orientation of orientation sensor 108 and/or display 104. Orientation sensor 108 may be, or may include, any suitable means for determining an orientation of apparatus 100 or of display 104. For example, orientation sensor 108 may include one or more inertial measurement units or gravity-based switches. Additionally or alternatively, UI 102 may use camera 109 (which may include one or more cameras on one or more surfaces of apparatus 100) to capture images (e.g., of a user). Camera 109 may be, or may include, for example, an active-depth camera, an infra-red (IR) camera, a red-green-blue (RGB) camera, stereo cameras, an eye-facing camera, or any combination thereof. UI 102 may detect gestures in images of a user of apparatus 100. UI 102 may interpret the gestures as user input. For example, UI 102 may interpret hand gestures to receive the user input; additionally or alternatively, UI 102 may interpret eye movements to receive user input. Thus, UI 102 may implement a hand tracking technique and/or an eye tracking technique. Additionally or alternatively, UI 102 may include a keyboard, a keypad, a trackpad, any other output devices, any other input devices, or any combination thereof.

UI 102 may receive user input 110 and interpret user input 110 relative to image 114. More specifically, UI 102 may interpret user input 110 as in indication of a desired change 116 to a field of view of image 114. For example, a user may perform a pinch touch gesture on touch sensor 106 (e.g., touching touch sensor 106 at two separate points and bringing the touched points together). UI 102 may interpret the pinch touch gesture as a desire to expand a field of view of image 114. As another example, the user may perform a drag touch gesture on touch sensor 106 (e.g., touching one or more points of touch sensor 106 and moving the touched one or more points in a direction, such as in a substantially straight line). UI 102 may interpret the drag touch gesture as a desire to pan the field of view of image 114. As another example, the user may perform a rotating touch gesture on touch sensor 106 (e.g., touching one or more points of touch sensor 106 and moving the touched one or more points in an arc). UI 102 may interpret the rotating touch gesture as a desire rotate the field of view within a frame of image 114. As another example, the user may rotate apparatus 100. UI 102 may interpret the rotating of apparatus 100 as a desire to rotate a frame of image 114 (e.g., from a landscape frame to a portrait frame or vice versa). As another example, a user may wave both hands to one side to indicate a desire to pan. Camera 109 may capture images of the user waving both hands and UI 102 may track the hands in the images and interpret the waving hands as a desire to pan. As another example, apparatus 100 may be, or may be included in a head-mounted device. Camera 109 may face eyes of a user. The user may hold their gaze at a side of an image. UI 102 may interpret the gaze as a desire to pan the image to that side. UI 102 may generate change 116 which may be data indicative of the desired change. For example, change 116 may encode the desired change as an instruction relative to image 114.

Processor(s) 118 may be, or may include, one or more suitable processors configured to perform computing operations. System 1200 of FIG. 12 and/or computing-device architecture 1800 of FIG. 18 may be examples of processor(s) 118. Processor(s) 118 may, among other things, implement generative machine-learning model 120. Additionally or alternatively, processor(s) 118 may be in communication with another computing device (e.g., a server computer or a laptop computer, not illustrated in FIG. 1) that may implement generative machine-learning model 121. Generative machine-learning model 121 may be the same as, substantially the same as, perform the same, or substantially the same operations as, generative machine-learning model 120. All descriptions of operations performed by generative machine-learning model 120 and/or training of generative machine-learning model 120 apply to generative machine-learning model 121 as well. All operations described as being performed by generative machine-learning model 120 may, additionally or alternatively, be performed by generative machine-learning model 121. Generative machine-learning model 120 (and/or generative machine-learning model 121) may be a trained generative machine-learning model capable of generating new image data based on provided conditions and/or instructions. Additional detail regarding generative machine-learning models and training of generative machine-learning models is provided with regard to FIG. 12, FIG. 13, FIG. 14, and FIG. 15. Generative machine-learning model 120 (and/or generative machine-learning model 121) may be trained according to the descriptions provided with regard to FIG. 12, FIG. 13, FIG. 14, and FIG. 15.

Apparatus 100 may provide at least a part of image 114 to generative machine-learning model 120 (and/or generative machine-learning model 121) as an input or as a condition. For example, in some cases, for example, when the desired change includes panning, apparatus 100 may select a part of image 114 (e.g., the part that will be included in image 122 after the pan) and provide the part of image 114 to generative machine-learning model 120 (or generative machine-learning model 121) as an input or condition. Generative machine-learning model 120 (and/or generative machine-learning model 121) may generate image 122 based on the at least a part of image 114 (e.g., using the at least a part of image 114 as a condition). Further, apparatus 100 may instruct generative machine-learning model 120 (and/or generative machine-learning model 121) relative to generating image 122 based on change 116. For example, processor(s) 118 may determine operational parameters or operational instructions for generative machine-learning model 120 (and/or generative machine-learning model 121) based on change 116. Image 122, generated based on image 114, may include at least part of image 114 of the field of view of image 114 and generated pixels outside of the field of view. For example, based on the desired change, image 122 may include part or all of image 114.

Additionally or alternatively, apparatus 100 (e.g., using processor(s) 118) may smooth edges between generated pixels and pixels from image 114. For example, generative machine-learning model 120 and/or generative machine-learning model 121 can be trained with images having a larger field of view (FOV) than the reference. For instance, the input images may be, or may include, a cropped smaller centered FOV image, or several cropped smaller images either centered (e.g., simultaneously-captured images from multiple cameras) or centered differently (sequentially-captured images from one camera). As another example, apparatus 100 may identify an edge (e.g., based on dimensions of image 114), or be informed of an edge (e.g., by generative machine-learning model 120 or generative machine-learning model 121) between generated pixels and pixels from image 114 and smooth the edge using a fusing, blending, and/or filtering technique. For example, apparatus 100 may generate a new value (e.g., a red, green, and/or blue value) for a pixel based on values of other pixels (e.g., surrounding pixels). For example, apparatus 100 may determine the new value for a pixel based on values of adjacent pixels, for example, where some of the adjacent pixels are part of the original image 114 and others of the adjacent pixels are part of the generated image data. As another example, the systems and techniques may use a filter (e.g., a 3×3 pixel filter or a 5×5 pixel filter), for example, to average pixel values across edges.

In some aspects, processor(s) 118 may cause UI 102 to display image 122 at display 104. Additionally or alternatively, processor(s) 118 may analyze image 122 or cause image 122 to be analyzed by one or more other processors. Additionally or alternatively, processor(s) 118 may cause image 122 to be stored (e.g., at a memory) or transmitted for display and/or analysis at a later time or at a different location.

By interpreting user input 110 as a change 116 relative to image 114 and instructing generative machine-learning model 120 (and/or generative machine-learning model 121) based on change 116, apparatus 100 may provide a user with an easy and convenient way to instruct generative machine-learning model 120 (and/or generative machine-learning model 121) relative to the generation of image 122. For example, based on a pinch gesture (e.g., a touch pinch gesture, a pinch gesture made with two hands, or a pinch gesture based on a user crossing their eyes), apparatus 100, through change 116, may instruct generative machine-learning model 120 (and/or generative machine-learning model 121) to generate image content to surround image 114 in image 122 (e.g., as if image 122 was image 114 were captured with a wider field of view). An example of generating image content based on expanding a field of view is provided in FIG. 2. As another example, based on a drag gesture (e.g., a drag touch gesture, a drag gesture made with one or more hands of a user, or a drag gesture based on a user gazing at one side of an image), apparatus 100, through change 116, may instruct generative machine-learning model 120 (and/or generative machine-learning model 121) to generate image content on a side of image 114 in image 122 (e.g., as if image 122 was image 114 were captured of a panned field of view). An example of generating image content based on panning a field of view is provided in FIG. 3. As another example, based on a rotating gesture (e.g., based on a rotating pinch gesture, a rotating gesture made with hands, or an eye roll gesture), apparatus 100, through change 116, may instruct generative machine-learning model 120 (and/or generative machine-learning model 121) to generate image content to fill corners of image 122 around a rotated version of image 114 in image 122 (e.g., as if image 122 was image 114 captured from a rotated camera). An example of generating image content based on rotated a field of view is provided in FIG. 4. As another example, based on a rotation of apparatus 100, apparatus 100, through change 116, may instruct generative machine-learning model 120 (and/or generative machine-learning model 121) to generate content to a right and a left side of image 114, or above and below image 114, (e.g., as if image 122 was image 114 captured from a camera rotated 90 degrees). An example of generating image content based on rotating a field of view by 90 degrees is provided in FIG. 5.

Figure 2:
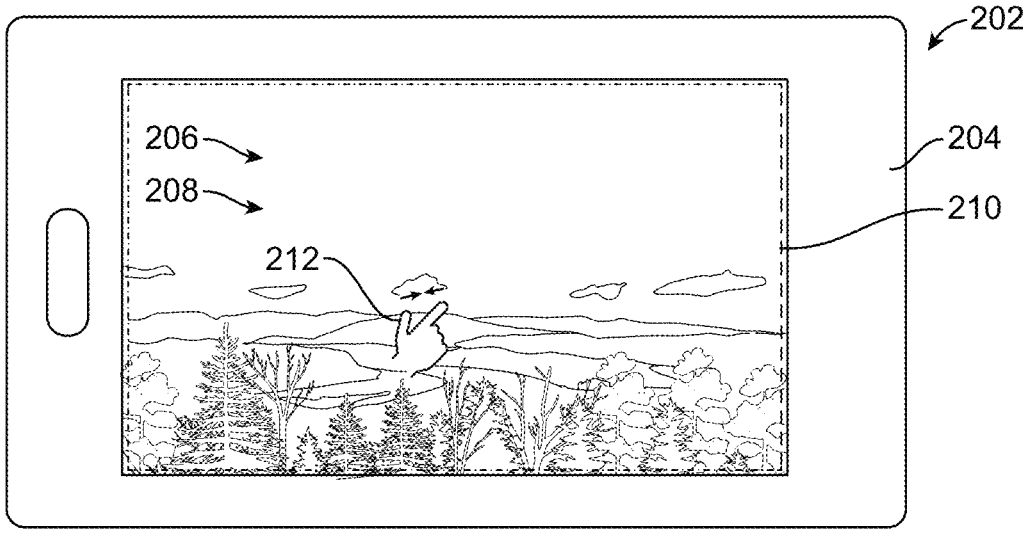
FIG. 2 includes an example representation of an apparatus displaying an image (e.g., which may be captured by the apparatus) and an example representation of the apparatus displaying an image (e.g., including generated image content), according to various aspects of the present disclosure.
Figure 2:
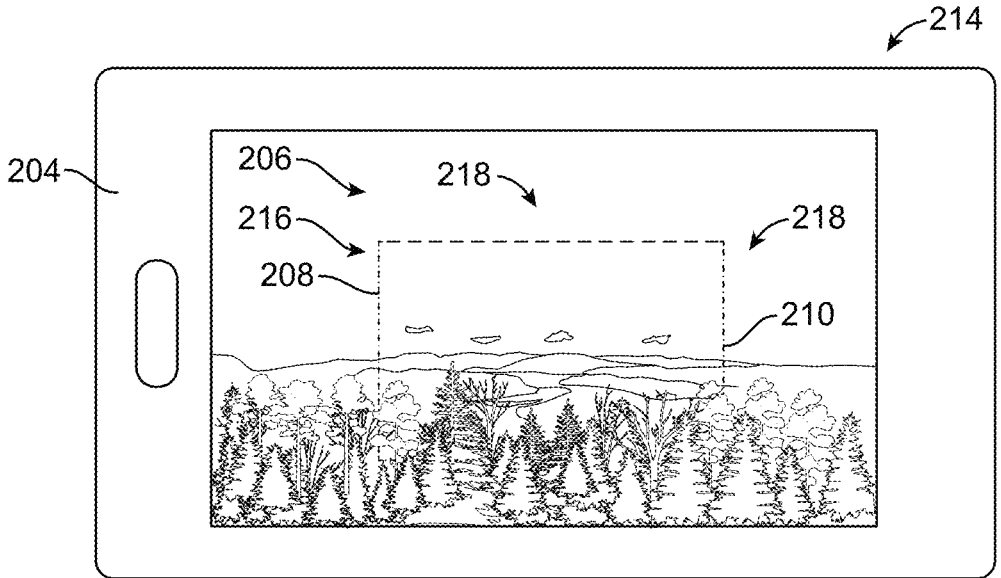

FIG. 2 includes an example representation 202 of an apparatus 204 displaying an image 208 (e.g., which may be captured by apparatus 204) and an example representation 214 of apparatus 204 displaying an image 216 (e.g., including generated image content, such as generated pixels 218), according to various aspects of the present disclosure. In general, apparatus 204 may implement the systems and techniques by displaying image 208, receiving a user input (e.g., a pinch gesture 212), and generating image 216 (including generated pixels 218) based on image 208 and the user input (e.g., pinch gesture 212).

For example, representation 202 includes apparatus 204 (which may be an example of apparatus 100 of FIG. 1). Apparatus 204 implements a UI 206 (which may be implemented by UI 102 of FIG. 1 on display 104 of FIG. 1). UI 206 displays image 208. Image 208 may be captured by a camera (e.g., camera 112 of FIG. 1) of apparatus 204, for example, image 208 may be an example of image 114 of FIG. 1. Image 208 may be of a field of view 210. In other words, image 208 may represent field of view 210 of a scene. For purposes of illustration, field of view 210 is illustrated using a dashed-line box within UI 206 (e.g., smaller than image 208). In practice, field of view 210 may have the same extent as field of view 210 and/or may fill UI 206 because image 208 is of field of view 210. Other fields of view (e.g., field of view 310, field of view 410, field of view 510, field of view 710, field of view 718, field of view 910, and field of view 918) are similarly illustrated with respect to UI 206 and their respective images (e.g., image 308, image 408, image 508, image 708, image 716, image 908, and image 916).

UI 206 may receive a user input (e.g., pinch gesture 212). For example, UI 206 may include a touch sensor (e.g., touch sensor 106 of FIG. 1). The touch sensor may sense touches and UI 206 may interpret the touches as inputs. Further, UI 206 may interpret the touches as inputs relative to image 208. For example, UI 206 may interpret the center of pinch gesture 212 relative to image 208 and/or an extent of pinch gesture 212 relative to image 208. UI 206 may determine a change (e.g., change 116 of FIG. 1) based on pinch gesture 212. The change may be a change to field of view 210. For example, UI 206 may interpret pinch gesture 212 as a desire to change field of view 210, for example, by expanding field of view 210 (e.g., by zooming out). UI 206 may determine the center of pinch gesture 212 to be the new center of the new image and UI 206 may determine the extent of pinch gesture 212 to determine the extent of the new field of view of the new image.

Apparatus 204 may include one or more processors (e.g., processor(s) 118 of FIG. 1) and may implement a generative machine-learning model (e.g., generative machine-learning model 120 of FIG. 1). Additionally or alternatively, apparatus 204 may be in communication with another computing device that may implement the generative machine-learning model (e.g., generative machine-learning model 121 of FIG. 1). Apparatus 204 may provide image 208 (e.g., as a condition) and instructions based on the change to the generative machine-learning model. The generative machine-learning model may generate image 216 based on image 208 and the instructions. UI 206 may display image 216 at UI 206 as illustrated in representation 214. Image 216 may include image 208 of field of view 210 and generated pixels 218 outside field of view 210. For example, based on pinch gesture 212 indicating a desire to expand field of view 210, image 216 may include image 208 of field of view 210 and generated pixels 218 on two or more sides of field of view 210. Additionally or alternatively, apparatus 204 may smooth edges between generated pixels 218 and pixels from image 208. For example, the generative machine-learning model can be trained with images having a larger field of view (FOV) than the reference. For instance, the input images may be, or may include, a cropped smaller centered FOV image; or several cropped smaller images either centered (e.g., simultaneously-captured images from multiple cameras) or centered differently (sequentially-captured images from one camera). Image 216 may appear to be image 208 as if image 208 were captured of a larger field of view.

Figure 3:
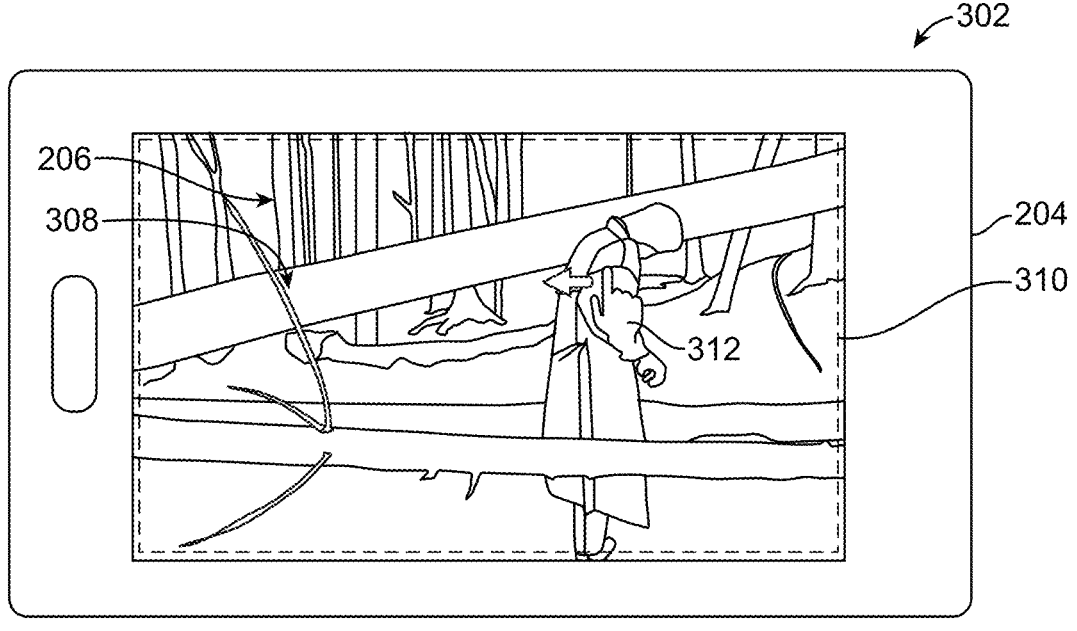
FIG. 3 includes an example representation of an apparatus displaying an image (e.g., which may be captured by the apparatus) and an example representation of the apparatus displaying an image (e.g., including generated image content), according to various aspects of the present disclosure.
Figure 3:
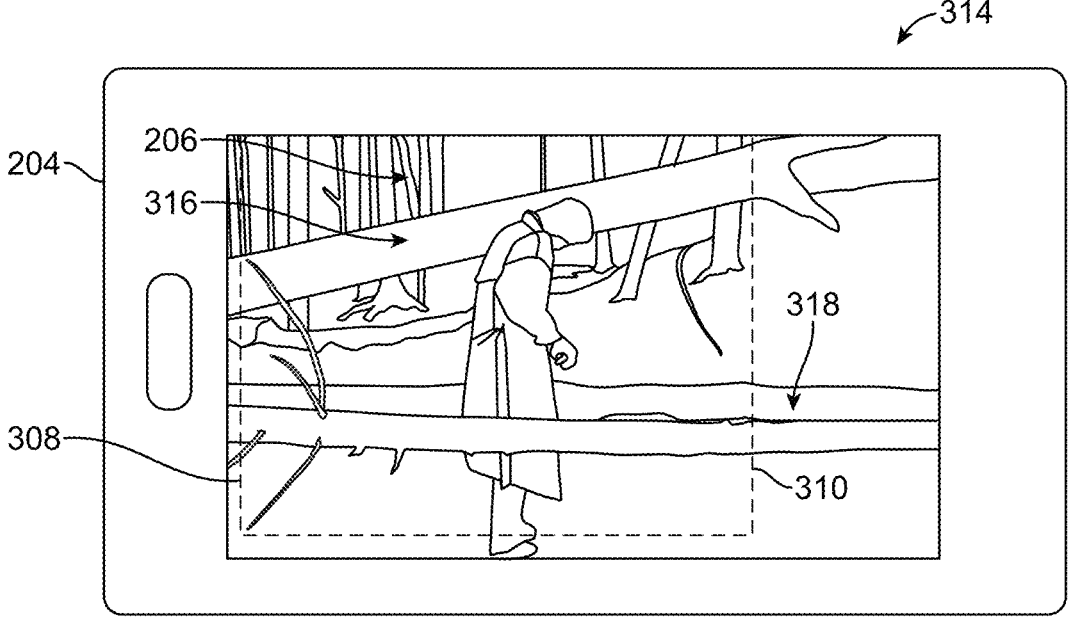

FIG. 3 includes an example representation 302 of apparatus 204 displaying an image 308 (e.g., which may be captured by apparatus 204) and an example representation 314 of apparatus 204 displaying an image 316 (e.g., including generated image content, such as generated pixels 318), according to various aspects of the present disclosure. In general, apparatus 204 may implement the systems and techniques by displaying image 308, receiving a user input (e.g., a drag gesture 312), and generating image 316 (including generated pixels 318) based on image 308 and the user input (e.g., drag gesture 312).

For example, representation 302 includes apparatus 204 implementing UI 206, which UI 206 displays image 308. Image 308 may be captured by a camera (e.g., camera 112 of FIG. 1) of apparatus 204. Image 308 may be an example of image 114 of FIG. 1. Image 308 may be of a field of view 310, for example, image 308 may represent field of view 310 of a scene.

UI 206 may receive a user input (e.g., drag gesture 312) and interpret the user input relative to image 308. For example, UI 206 may determine a starting point of drag gesture 312 and an ending point of drag gesture 312 relative to image 308. Additionally or alternatively, UI 206 may determine a length and direction of drag gesture 312. UI 206 may determine a change (e.g., change 116 of FIG. 1) based on drag gesture 312. The change may be a change to field of view 310. For example, UI 206 may interpret drag gesture 312 as a desire to change field of view 310, for example, by panning field of view 310. UI 206 may determine a direction and length of the desired change to field of view 310.

Apparatus 204 may provide at least a part of image 308 (e.g., as a condition) and instructions based on the change to a generative machine-learning model (e.g., generative machine-learning model 120 and/or generative machine-learning model 121 of FIG. 1) of apparatus 204. For example, based on drag gesture 312, apparatus 204 may determine a part of image 308, for example, the portion out of image 308 that may remain in the frame following the pan, and provide the part to the generative machine-learning model. Alternatively, apparatus 204 may provide all of image 308 to the generative machine-learning model. The generative machine-learning model may generate image 316 based on at least a part of image 308 and the instructions and UI 206 may display image 316 at UI 206 as illustrated in representation 314. Image 316 may include at least a part of image 308 of field of view 310 and generated pixels 318 outside field of view 310. For example, based on drag gesture 312 indicating a desire to pan field of view 310, image 316 may include at least a part of image 308 of field of view 310 and generated pixels 318 on one or more sides of field of view 310. Additionally or alternatively, apparatus 204 may smooth edges between generated pixels 318 and pixels from image 308. Image 316 may appear to be image 308 as if image 308 were captured of a panned field of view. In cases in which image 316 includes a part of image 308, the part of image 308 included in image 316 may be the same the part of image 308 provided by apparatus 204. Alternatively, the part of image 308 included in image 316 may be a subset of what is provided by apparatus 204. For example, apparatus 204 may provide all of image 308 (or a large part of image 308) and image 316 may include a subset of what was provided.

Figure 4:
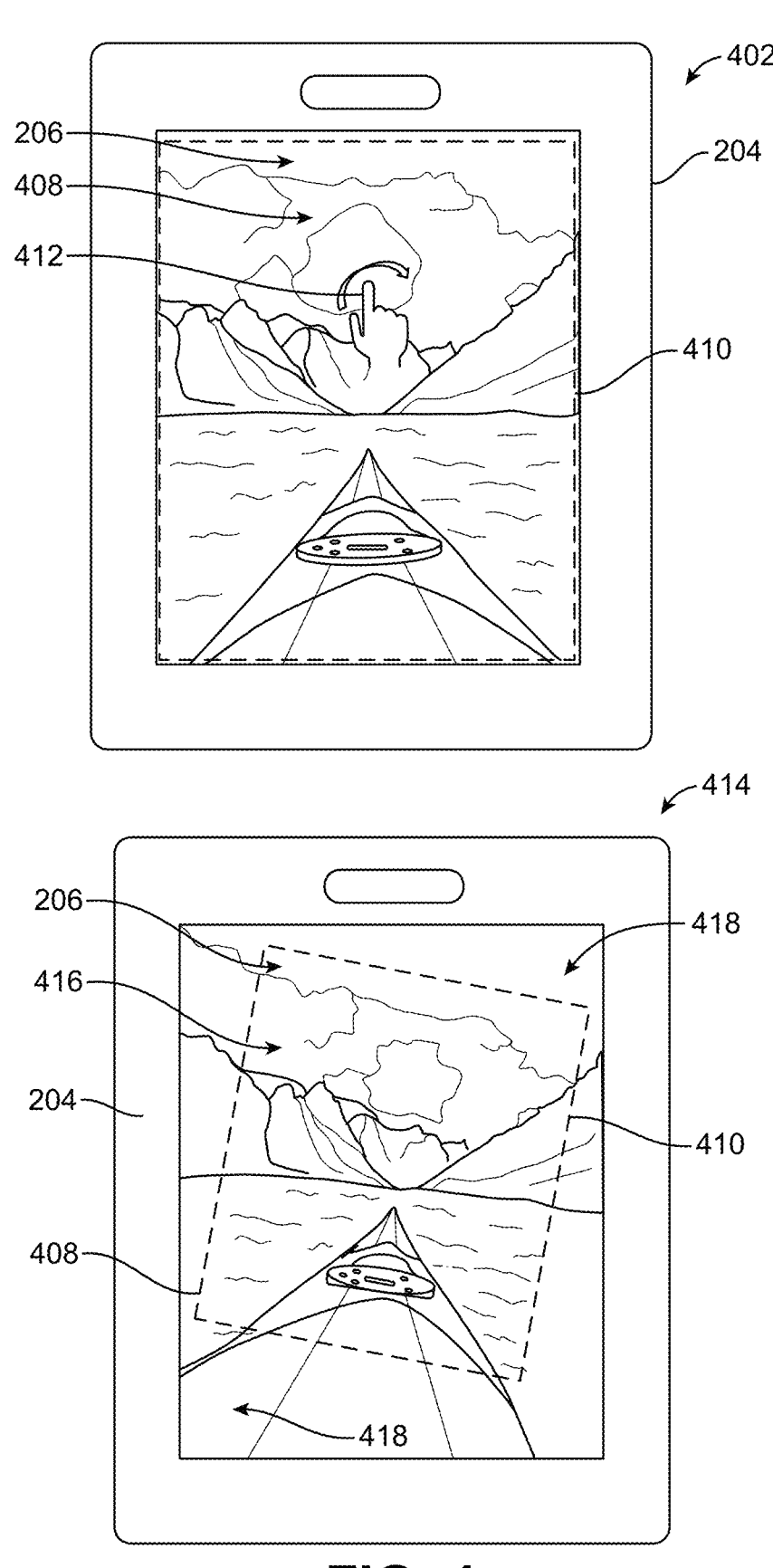
FIG. 4 includes an example representation of an apparatus displaying an image (e.g., which may be captured by the apparatus) and an example representation of the apparatus displaying an image (e.g., including generated image content), according to various aspects of the present disclosure.

FIG. 4 includes an example representation 402 of apparatus 204 displaying an image 408 (e.g., which may be captured by apparatus 204) and an example representation 414 of apparatus 204 displaying an image 416 (e.g., including generated image content, such as generated pixels 418), according to various aspects of the present disclosure. In general, apparatus 204 may implement the systems and techniques by displaying image 408, receiving a user input (e.g., a rotate gesture 412), and generating image 416 (including generated pixels 418) based on image 408 and the user input (e.g., rotate gesture 412).

For example, representation 402 includes apparatus 204 implementing UI 206, which UI 206 displays image 408. Image 408 may be captured by a camera (e.g., camera 112 of FIG. 1) of apparatus 204. Image 408 may be an example of image 114 of FIG. 1. Image 408 may be of a field of view 410, for example, image 408 may represent field of view 410 of a scene.

UI 206 may receive a user input (e.g., rotate gesture 412) and interpret the user input relative to image 408. For example, UI 206 may interpret a starting point of rotate gesture 412 and an ending point of rotate gesture 412 relative to image 408. Additionally or alternatively, UI 206 may determine a rotational length and/or rotational direction of rotate gesture 412. UI 206 may determine a change (e.g., change 116 of FIG. 1) based on rotate gesture 412. The change may be a change to field of view 410. For example, UI 206 may interpret rotate gesture 412 as a desire to change field of view 410, for example, by rotating field of view 410. UI 206 may determine a rotational length and/or direction of the desired change to field of view 410.

Apparatus 204 may provide at least a part of image 408 (e.g., as a condition) and instructions based on the change to a generative machine-learning model (e.g., generative machine-learning model 120 and/or generative machine-learning model 121 of FIG. 1) of apparatus 204. For example, based on drag gesture 312, apparatus 204 may determine a part of image 408, for example, excluding corners that may be cut from the frame by the rotation of image 408, and provide the part to the generative machine-learning model. Alternatively, apparatus 204 may provide all of image 408 to the generative machine-learning model. The generative machine-learning model may generate image 416 based on at least a part of image 408 and the instructions and UI 206 may display image 416 at UI 206 as illustrated in representation 414. Image 416 may include at least a part of image 408 of field of view 410 and generated pixels 418 outside field of view 410. For example, based on rotate gesture 412 indicating a desire to rotate field of view 410, image 416 may include at least a part of image 408 of field of view 410 and generated pixels 418 at one or more corners of image 416. Additionally or alternatively, apparatus 204 may smooth edges between generated pixels 418 and pixels from image 408. Image 416 may appear to be image 408 as if image 408 were captured of a rotated field of view. In cases in which image 416 includes a part of image 408, the part of image 408 included in image 416 may be the same the part of image 408 provided by apparatus 204. Alternatively, the part of image 408 included in image 416 may be a subset of what is provided by apparatus 204. For example, apparatus 204 may provide all of image 408 (or a large part of image 408) and image 416 may include a subset of what was provided.

In some aspects, apparatus 204 may provide image 408 (unrotated) to the generative machine-learning model and the generative machine-learning model may generate an intermediate image that includes generated pixels outside image 408 of field of view 410. The intermediate image may be unrotated relative to image 408. For example, the intermediate image may include image 408 of field of view 410 unrotated (e.g., in a center of the intermediate image). Apparatus 204 may rotate and crop the intermediate image to generate image 416. In other aspects, apparatus 204 may rotate image 408 and provide a rotated version of image 408 to the generative machine-learning model. The generative machine-learning model may generate image 416 based on the rotated version of image 408.

Figure 5:
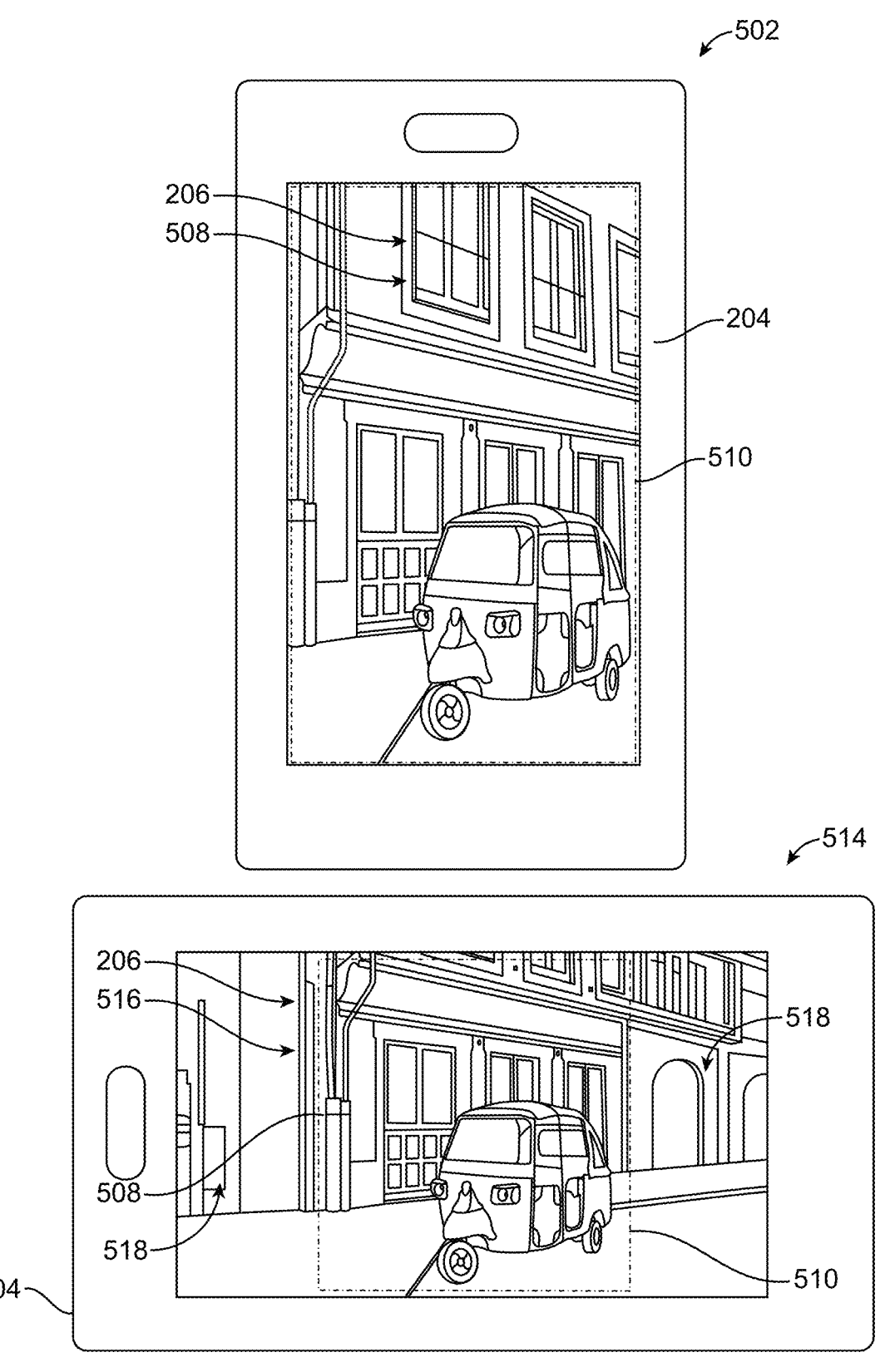
FIG. 5 includes an example representation of an apparatus displaying an image (e.g., which may be captured by the apparatus) and an example representation of the apparatus displaying an image (e.g., including generated image content), according to various aspects of the present disclosure.

FIG. 5 includes an example representation 502 of apparatus 204 displaying an image 508 (e.g., which may be captured by apparatus 204) and an example representation 514 of apparatus 204 displaying an image 516 (e.g., including generated image content, such as generated pixels 518), according to various aspects of the present disclosure. In general, apparatus 204 may implement the systems and techniques by displaying image 508, receiving a user input (e.g., a rotation of apparatus 204 from representation 502 to representation 514), and generating image 516 (including generated pixels 518) based on image 508 and the user input (e.g., rotation of apparatus 204 to representation 514).

For example, representation 502 includes apparatus 204 implementing UI 206, which UI 206 displays image 508. Image 508 may be captured by a camera (e.g., camera 112 of FIG. 1) of apparatus 204. Image 508 may be an example of image 114 of FIG. 1. Image 508 may be of a field of view 510, for example, image 508 may represent field of view 510 of a scene.

UI 206 may receive a user input (e.g., rotation of apparatus 204 to representation 514) and interpret the user input relative to image 508. UI 206 may determine a change (e.g., change 116 of FIG. 1) based on rotation of apparatus 204. The change may be a change to field of view 510. For example, UI 206 may interpret rotation of apparatus 204 as a desire to change field of view 510, for example, by rotating field of view 510 by 90 degrees. For example, UI 206 may determine rotation of apparatus 204 as a desire to rotate image 508 from being in a portrait format to being in a landscape format.

Apparatus 204 may provide at least a part of image 508 (e.g., as a condition) and instructions based on the change to a generative machine-learning model (e.g., generative machine-learning model 120 and/or generative machine-learning model 121 of FIG. 1) of apparatus 204. For example, based on the rotation of 204, apparatus 204 may determine a part of image 508, for example, excluding a top part that may be cut from the frame by the rotation of image 508, and provide the part to the generative machine-learning model. Alternatively, apparatus 204 may provide all of image 508 to the generative machine-learning model. The generative machine-learning model may generate image 516 based on at least a part of image 508 and the instructions and UI 206 may display image 516 at UI 206 as illustrated in representation 514. Image 516 may include at least a part of image 508 of field of view 510 and generated pixels 518 outside field of view 510. For example, based on rotation of apparatus 204 indicating a desire to rotate image 508, image 516 may include at least a part of image 508 of field of view 510 and generated pixels 518 at one or more sides of the at least a part of image 508. Additionally or alternatively, apparatus 204 may smooth edges between generated pixels 518 and pixels from image 508. Image 516 may appear to be image 508 as if image 508 were captured of from a camera rotated by 90 degrees. In cases in which apparatus 204 is rotated from a portrait orientation to a landscape orientation, the generative machine-learning model may generate generated pixels 518 at both sides of at least a part of image 508 of field of view 510. In cases in which apparatus 204 is rotated from a landscape orientation to a portrait orientation, the generative machine-learning model may generate generated pixels 518 above and below at least a part of image 508 of field of view 510. In cases in which image 516 includes a part of image 508, the part of image 508 included in image 506 may be the same the part of image 508 provided by apparatus 204. Alternatively, the part of image 508 included in image 516 may be a subset of what is provided by apparatus 204. For example, apparatus 204 may provide all of image 508 (or a large part of image 508) and image 516 may include a subset of what was provided.

In some aspects, UI 206 may receive user input relative to an image including generated content. In such cases, apparatus 204 may generate additional content based on the user input and the image including the already-generated content. For example, after having generated image 216 of FIG. 2 (e.g., by expanding a field of view of image 208), UI 206 may receive a drag gesture relative to image 216. Apparatus 204 may generate another image based on the drag gesture and image 216. As another example, after having generated image 316 of FIG. 3 (e.g., by panning a field of view of image 308), UI 206 may receive a rotate gesture relative to image 316. Apparatus 204 may generate another image based on the rotate gesture and image 316.

In some aspects, UI 206 may receive user input indicating multiple desires. For example, a user input may include a pinch gesture, a drag gesture, and/or a rotate gesture. UI 206 may interpret the user input and generate instructions based on the interpreted desired changes. In some cases, UI 206 may generate one instruction based on all the desired changes and instruct the generative machine-learning model to generate an image once. In other cases, UI 206 may generate on instruction based on each of the desired changes and instruct the generative machine-learning model to generate several images in series to implement the desired changes.

Figure 6:
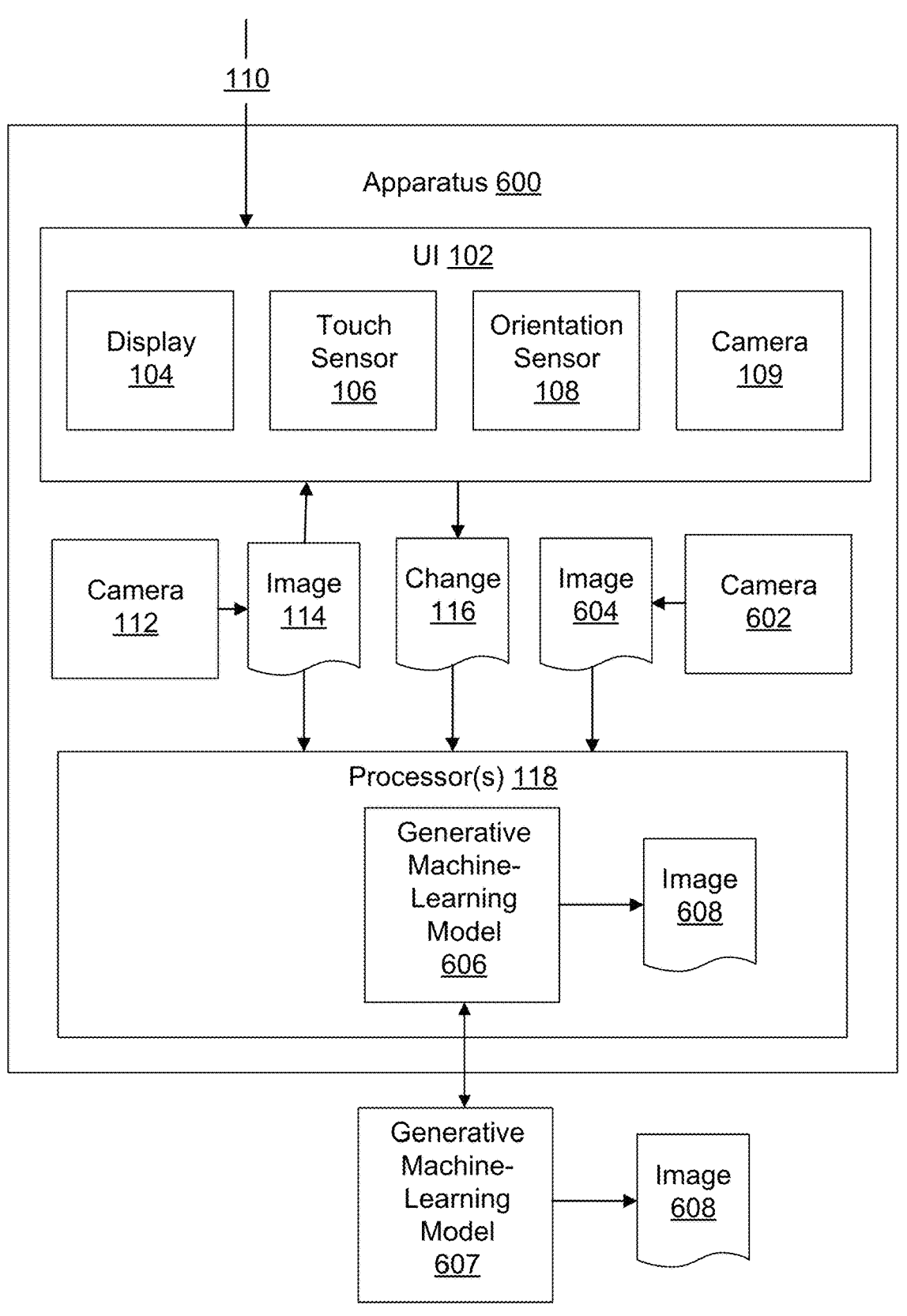
FIG. 6 is a block diagram illustrating another example apparatus for generating image content, according to various aspects of the present disclosure.

FIG. 6 is a block diagram illustrating an example apparatus 600 for generating image content, according to various aspects of the present disclosure. In general, a camera 112 of apparatus 600 may capture an image 114 and a camera 602 may capture an image 604. Alternatively, image 114 and/or image 604 may be obtained from another source (e.g., via a communication interface). Image 114 may represent a first field of view of a scene and image 604 may represent a second field of view of the scene. Apparatus 600 may use a generative machine-learning model to generate image 608 based on image 114 and image 604. In some aspects, processor(s) 118 may use a generative machine-learning model 606 to generate image 608. In other aspects, apparatus 600 may use a generative machine-learning model 607, which may be implemented on another computing device (e.g., a laptop, a mobile phone, or a server) to generate image 608. Apparatus 600 may provide at least a part of image 114 and at least a part of image 604 to generative machine-learning model 606 (and/or generative machine-learning model 607) as inputs or conditions and generative machine-learning model 606 (and/or generative machine-learning model 607) may generate image 608 based on the at least a part of image 114 and the at least a part of image 604.

Additionally or alternatively, UI 102 of apparatus 100 may display image 114 (and/or image 604) at a display 104 of UI 102. UI 102 may receive a user input 110 indicative of a desired change 116 to image 114 (and/or image 604) (e.g., at a touch sensor 106 and/or using an orientation sensor 108). The desired change 116 to image 114 (and/or image 604) may be, or may include, a change to the first field of view of image 114 and/or a change to the second field of view of image 604. Further, processor(s) 118 may provide instructions to generative machine-learning model 606 and/ or generative machine-learning model 607 regarding the generation of image 608. The instructions may be based on change 116. Generative machine-learning model 606 and/or generative machine-learning model 607 may generate image 608 to include image 114 of the first field of view and/or image 604 of the second field of view and generated pixels outside of the first field of view and the second field of view based on the change 116.

Apparatus 600 may be substantially similar to, and/or may perform many of the same, operations as apparatus 100 of FIG. 1. For example, UI 102 may be the same in apparatus 600 as it is in apparatus 100 and UI 102 may operate in apparatus 600 in the same way that UI 102 operates in apparatus 100. Except, in apparatus 600, UI 102 may display image 604 at display 104 and receive user input 110 relative to image 604. UI 102 may generate a change 116 indicative of a change to a field of view of image 114 (or of image 604).

Further, camera 112 may be the same as, may be substantially similar to, and/or may perform the same, or substantially the same, operations as camera 112 of apparatus 100. Image 114 in apparatus 100 may be the same as, or may be substantially similar to, image 114 in apparatus 600. Camera 602 may be another instance of camera 112. For example, camera 602 may be an example of image-processing system 1100 of FIG. 11. In some aspects, camera 602 may have a different focal length than camera 112. For example, camera 112 may include a wide-angle lens and camera 602 may include an ultra-wide-angle lens. Additionally or alternatively, camera 112 may be located in a different position on apparatus 600 than camera 602. Camera 112 may capture image 114 of a different field of view than the field of view captured by camera 602 of image 604.

Processor(s) 118 of apparatus 600 may be the same as, may be substantially similar to, and/or may perform the same, or substantially the same, operations as processor(s) 118 of apparatus 100. However, generative machine-learning model 606 of apparatus 600 may be different from generative machine-learning model 120 of apparatus 100. For example, whereas generative machine-learning model 120 may be trained to generate an image including generated content based on an input image, generative machine-learning model 606 may be trained to generate an image including generated content based on two or more input images. Similarly, generative machine-learning model 607 may be trained to generate an image including generated content based on two or more input images. Additional detail regarding generative machine-learning models and training of generative machine-learning models is provided with regard to FIG. 12, FIG. 13, FIG. 14, and FIG. 15. Generative machine-learning model 606 and/or generative machine-learning model 607 may be trained according to the descriptions provided with regard to FIG. 12, FIG. 13, FIG. 14, and FIG. 15.

Apparatus 600 may provide at least a part of image 114 and at least a part of image 604 to generative machine-learning model 606 (and/or generative machine-learning model 607) as inputs or as conditions. Generative machine-learning model 606 (and/or generative machine-learning model 607) may generate image 608 based on at least a part of image 114 and at least a part of image 604 (e.g., using the at least a part of image 114 and the at least a part of image 604 as conditions). Further, apparatus 600 may instruct generative machine-learning model 606 (and/or generative machine-learning model 607) relative to generating image 608 based on change 116. For example, processor(s) 118 may determine operational parameters or operational instructions for generative machine-learning model 606 (and/or generative machine-learning model 607) based on change 116. Image 608, generated based on image 114 and image 604, may include at least part of image 114 of the field of view of image 114 and at least a part of image 604 of the field of view of image 604 and generated pixels outside of the fields of view. For example, based on the desired change, image 608 may include part or all of image 114 and/or part or all of image 604. Additionally or alternatively, apparatus 600 may smooth edges between generated pixels and pixels from image 604.

In some aspects, processor(s) 118 may cause UI 102 to display image 608 at display 104. Additionally or alternatively, processor(s) 118 may analyze image 608 or cause image 608 to be analyzed by one or more other processors. Additionally or alternatively, processor(s) 118 may cause image 608 to be stored (e.g., at a memory) or transmitted for display and/or analysis at a later time or at a different location.

By interpreting user input 110 as a change 116 relative to image 114 and/or image 604 and instructing generative machine-learning model 606 (and/or generative machine-learning model 607) based on change 116, apparatus 600 may provide a user with an easy and convenient way to instruct generative machine-learning model 606 (and/or generative machine-learning model 607) relative to the generation of image 608. For example, based on a pinch gesture, apparatus 600, through change 116, may instruct generative machine-learning model 606 (and/or generative machine-learning model 607) to generate image content to surround image 114 and/or image 604 in image 608 (e.g., as if image 608 was image 114 or image 604 captured with a wider field of view). An example of generating image content based on expanding a field of view is provided in FIG. 2. The example of FIG. 2 could be implemented by apparatus 600 with the addition of a second input image. As another example, based on a drag gesture, apparatus 600, through change 116, may instruct generative machine-learning model 606 (and/or generative machine-learning model 607) to generate image content on a side of image 114 and/or of image 604 in image 608 (e.g., as if image 608 was image 114 and/or image 604 captured from a panned field of view). An example of generating image content based on panning a field of view is provided in FIG. 3. The example of FIG. 3 could be implemented by apparatus 600 with the addition of a second input image. As another example, based on a rotating gesture, apparatus 600, through change 116, may instruct generative machine-learning model 606 (and/or generative machine-learning model 607) to generate image content to fill corners of image 608 around a rotated version of image 114 and/or image 604 in image 608 (e.g., as if image 608 was image 114 and/or image 604 captured from a rotated camera). An example of generating image content based on rotated a field of view is provided in FIG. 4. The example of FIG. 4 could be implemented by apparatus 600 with the addition of a second input image. As another example, based on a rotation of apparatus 600, apparatus 600, through change 116, may instruct generative machine-learning model 606 (and/or generative machine-learning model 607) to generate content to a right and a left side of image 114 and/or of image 604, or above and below image 114 and/or image 604, (e.g., as if image 608 was image 114 and/or image 604 captured from a camera rotated 90 degrees). An example of generating image content based on rotating a field of view by 90 degrees is provided in FIG. 5. The example of FIG. 5 could be implemented by apparatus 600 with the addition of a second input image.

Figure 7:
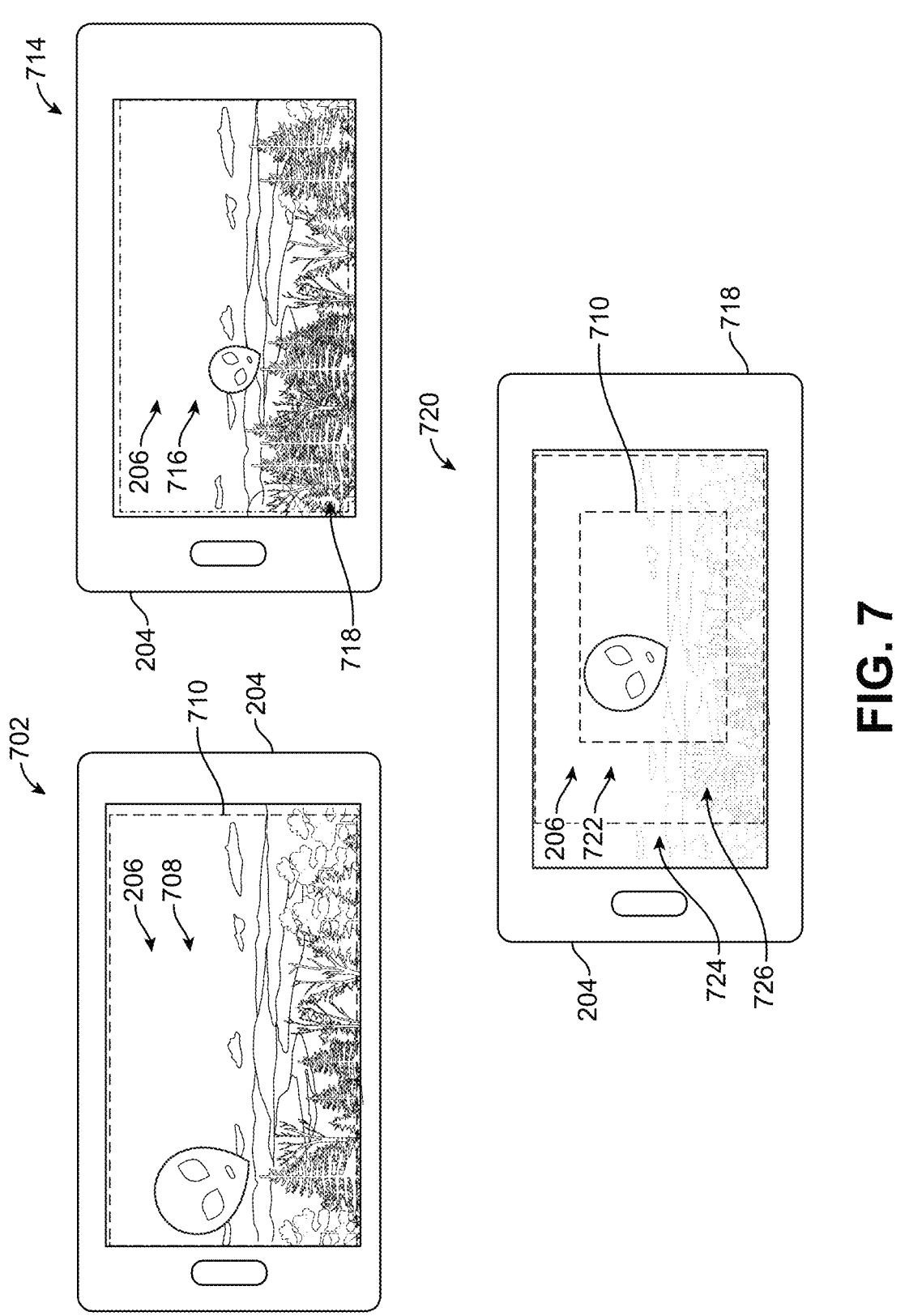
FIG. 7 includes an example representation of an apparatus displaying an image (e.g., which may be captured by a first camera of the apparatus), an example representation of the apparatus displaying another image (e.g., which may be captured by a second camera of the apparatus), and an example representation of the apparatus displaying yet another image (e.g., including generated image content), according to various aspects of the present disclosure.

FIG. 7 includes an example representation 702 of apparatus 204 displaying an image 708 (e.g., which may be captured by a first camera of apparatus 204), an example representation 714 of apparatus 204 displaying an image 716 (e.g., which may be captured by a second camera of apparatus 204), and an example representation 720 of apparatus 204 displaying an image 722 (e.g., including generated image content, such as generated pixels 724 and/or modified pixels 726), according to various aspects of the present disclosure. In general, apparatus 204 may implement the systems and techniques by displaying image 708 and/or image 716 (e.g., at separate times, in a split screen, or partially overlaid), receiving a user input (e.g., a pinch gesture a drag gesture, a rotate gesture, or a rotation of apparatus 204), and generating image 722 (including generated pixels 724 and/or modified pixels 726) based on image 708, image 716, and the user input.

For example, representation 702 includes apparatus 204 implementing UI 206, which UI 206 displays image 708. Image 708 may be captured by a first camera (e.g., camera 112 of FIG. 6) of apparatus 204. Image 708 may be an example of image 114 of FIG. 6. Image 708 may be of a first field of view 710, for example, image 708 may represent field of view 710 of a scene.

Further, representation 714 includes apparatus 204 implementing UI 206, which UI 206 displays image 716. Image 716 may be captured by a second camera (e.g., camera 602 of FIG. 6) of apparatus 204. Image 716 may be an example of image 604 of FIG. 6. Image 716 may be of a second field of view 718, for example, image 716 may represent field of view 718 of the scene (e.g., the same scene represented by image 708). A focal length of a camera used to capture image 708 may be different than a focal length of a camera used to capture image 716. For example, image 716 may represent a wider field of view of scene than image 716 represents of the same scene.

UI 206 may receive a user input (e.g., a pinch gesture a drag gesture, a rotate gesture, or a rotation of apparatus 204) and interpret the user input relative to image 708 and/or image 716. The change may be a change to field of view 710 and/or field of view 718. For example, UI 206 may interpret the user input as a desire to change field of view 710 and/or field of view 718, for example, by expanding the field of view 710 and/or field of view 718, panning field of view 710 and/or field of view 718, and/or rotating field of view 710 and/or field of view 718.

Apparatus 204 may provide at least a part of image 708 and at least a part of image 716 (e.g., as conditions) and instructions based on the change to a generative machine-learning model (e.g., generative machine-learning model 606 and/or generative machine-learning model 607 of FIG. 6) of apparatus 204. For example, based on the desired change to the field of view, apparatus 204 may determine a part of image 708 and/or a part of image 716, for example, excluding a part of image 716 that may be cut from the frame by the panning, and provide the part to the generative machine-learning model. Alternatively, apparatus 204 may provide all of image 708 and/or all of image 716 to the generative machine-learning model. The generative machine-learning model may generate image 722 based on at least a part of image 708, at least a part of image 716, and the instructions and UI 206 may display image 722 at UI 206 as illustrated in representation 720. Image 722 may include at least a part of image 708 of the first field of view 710, at least a part of image 716 of the second field of view 718, generated pixels 724 (which may be, for example, outside field of view 710 and field of view 718), and/or modified pixels 726. For example, image 722 may include image 708 of field of view 710, image 716 of field of view 718, and generated pixels 724 on one or more sides of field of view 710 and/or field of view 718. Additionally or alternatively, image 722 may include modified pixels 726, which may be outside of field of view 710, inside field of view 718, and based on image 716. For example, the generative machine-learning model may generate modified pixels 726 based on image 716. Modified pixels 726 may, or may not, be the same as pixels in image 716. For example, modified pixels 726 may have a different resolution than image 716. Alternatively, modified pixels 726 may be inside field of view 710 of image 708. In such cases, modified pixels 726 may be based on image 708 and/or image 716. Modified pixels 726 may, or may not, be the same as pixels of image 708. For example, modified pixels 726 may have a different resolution than image 708. Additionally or alternatively, apparatus 204 may smooth edges between generated pixels 724 and pixels from image 708 and/or image 716. Image 722 may appear to be image 708 the scene as if image 708 were captured of a different field of view. Additionally or alternatively, image 722 may appear to be image 716 of the scene as if image 716 were captured of a different field of view. In cases in which image 722 includes a part of image 708 and/or a part of 716, the part of image 708 and/or the part of image 716 included in image 722 may be the same the part of image 708 and/or the part of 716 provided by apparatus 204. Alternatively, the part of image 708 and/or the part of image 716 included in image 722 may be a subset of what is provided by apparatus 204. For example, apparatus 204 may provide all of image 708 (or a large part of image 708) and image 722 may include a subset of what was provided.

Figure 8:
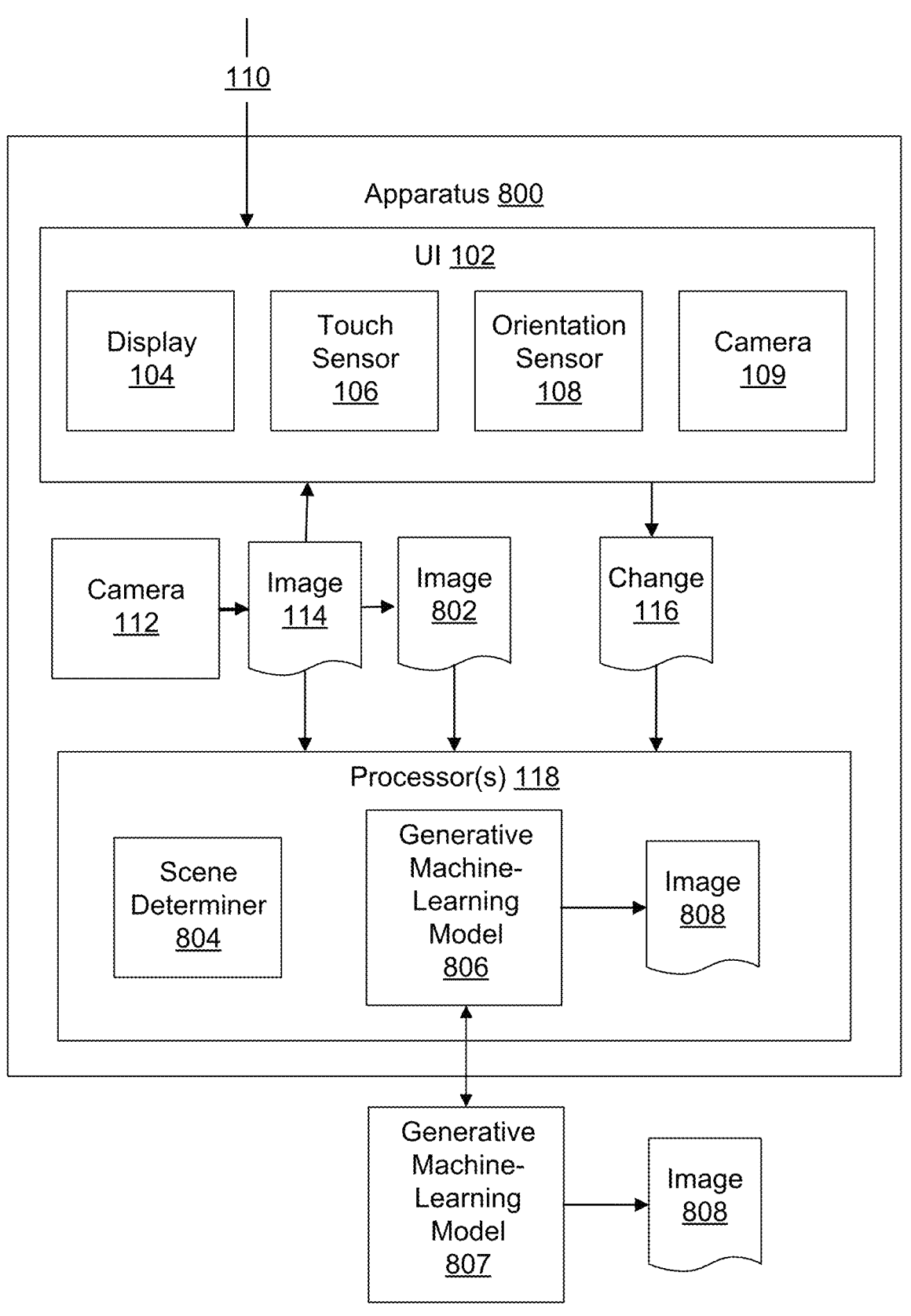
FIG. 8 is a block diagram illustrating yet another example apparatus for generating image content, according to various aspects of the present disclosure.

FIG. 8 is a block diagram illustrating an example apparatus 800 for generating image content, according to various aspects of the present disclosure. In general, a camera 112 of apparatus 100 may capture an image 114 (e.g., at a first time) and an image 802 (e.g., at a second time after the first time). Alternatively, image 114 and image 802 may be obtained from another source, for example, apparatus 800 may receive image 114 and image 802 from another device via a communication interface. Image 114 may represent a first field of view of a scene and image 802 may represent a second field of view of the scene (e.g., based on camera 112 having moved or changed orientation in between the first time and the second time). Apparatus 100 may use a generative machine-learning model (e.g., generative machine-learning model 806 and/or generative machine-learning model 807) to generate, image 808 based on at least a part of image 114 and at least a part of image 802. In some aspects, processor(s) 118 may use a generative machine-learning model 806 to generate image 802. In other aspects, apparatus 800 may use generative machine-learning model 807, which may be implemented on another computing device (e.g., a laptop, a mobile phone, or a server) to generate image 808. Processor(s) 118 may provide at least a part of image 114 and at least a part of image 802 to generative machine-learning model 806 and/or generative machine-learning model 807 as inputs or conditions and generative machine-learning model 806 and/or generative machine-learning model 807 may generate image 808 based on the at least a part of image 114 and the at least a part of image 802.

Additionally or alternatively, UI 102 of apparatus 100 may display image 114 (and/or image 802) at a display 104 of UI 102. UI 102 may receive a user input 110 indicative of a desired change 116 to image 114 (and/or image 802) (e.g., at a touch sensor 106 and/or using an orientation sensor 108). The desired change 116 to image 114 (and/or image 802) may be, or may include, a change to the first field of view of image 114 and/or a change to the second field of view of image 802. Further, processor(s) 118 may provide instructions to generative machine-learning model 806 (and/or generative machine-learning model 807) regarding the generation of image 808. The instructions may be based on change 116. Generative machine-learning model 806 (and/or generative machine-learning model 807) may generate image 808 to include at least part of (e.g., pixels of) image 114 of the first field of view and/or at least a part of (e.g., pixels of) image 802 of the second field of view and generated pixels outside of the first field of view and the second field of view based on the change 116.

Apparatus 800 may be substantially similar to, and/or may perform many of the same, operations as apparatus 100 of FIG. 1. For example, UI 102 may be the same in apparatus 800 as UI 102 is in apparatus 100 and UI 102 may operate in apparatus 800 in the same way that UI 102 operates in apparatus 100. Except, in apparatus 800, UI 102 may display image 802 at display 104 and receive user input 110 relative to image 802. UI 102 may generate a change 116 indicative of a change to a field of view of image 114 (and/or of image 802).

Further, camera 112 may be the same as, may be substantially similar to, and/or may perform the same, or substantially the same, operations as camera 112 of apparatus 100. Image 114 in apparatus 100 may be the same as, or may be substantially similar to, image 114 in apparatus 600. Further, camera 112 may capture image 802 (e.g., after camera 112 captures image 114). Camera 112 may capture image 114 of a different field of view than the field of view captured by camera 112 of image 802. For example, camera 112 may be pointed in a different direction, be moved, or be zoomed to a different focal length when capturing image 802 than when capturing image 114.

Processor(s) 118 of apparatus 600 may be the same as, may be substantially similar to, and/or may perform the same, or substantially the same, operations as processor(s) 118 of apparatus 100. However, generative machine-learning model 806 of apparatus 800 may be different from generative machine-learning model 120 of apparatus 100. For example, whereas generative machine-learning model 120 may be trained to generate an image including generated content based on an input image, generative machine-learning model 806 may be trained to generate an image including generated content based on two or more input images. Similarly, generative machine-learning model 807 may be trained to generate an image including generated content based on two or more input images. Additional detail regarding generative machine-learning models and training of generative machine-learning models is provided with regard to FIG. 12, FIG. 13, FIG. 14, and FIG. 15. Generative machine-learning model 806 and/or generative machine-learning model 807 may be trained according to the descriptions provided with regard to FIG. 12, FIG. 13, FIG. 14, and FIG. 15.

Further, processor(s) 118 may implement a scene determiner 804. Scene determiner 804 may determine that image 114 and image 802 represent the same scene (e.g., despite image 114 and image 802 representing different fields of view of the scene). Scene determiner 804 may determine that the scene is the same based on: capture times of image 114 and image 802, capture locations of image 114 and image 802 (e.g., as recorded by a location service of apparatus 800), movement of camera 112 between capturing of image 114 and image 802 (e.g., as recorded by an inertial measurement unit), a comparison of image 114 and image 802, or any combination thereof. Processor(s) 118 may determine to generate image 808 based on image 114 and/or image 802 based on scene determiner 804 determining that image 114 and image 802 represent the same scene and/or based on change 116. For example, Processor(s) 118 may determine to generate image 808 based on image 114 and image 802 in cases in which image 114 and image 802 represent different fields of view of the same scene and where change 116 relates to both of the fields of view.

Apparatus 800 may provide at least a part of image 114 and at least a part of image 802 to generative machine-learning model 806 (and/or generative machine-learning model 807) as inputs or as conditions. Generative machine-learning model 806 (and/or generative machine-learning model 807) may generate image 808 based on the at least a part of image 114 and the at least a part of image 802 (e.g., using image 114 and image 802 as conditions). Further, apparatus 800 may instruct generative machine-learning model 806 (and/or generative machine-learning model 807) relative to generating image 808 based on change 116. For example, processor(s) 118 may determine operational parameters or operational instructions for generative machine-learning model 806 (and/or generative machine-learning model 807) based on change 116. Image 808, generated based on image 114 and image 802, may include at least part of image 114 of the field of view of image 114 and at least a part of image 802 of the field of view of image 802 and generated pixels outside of the fields of view. For example, based on the desired change, image 808 may include part or all of image 114 and/or part or all of image 802. Additionally or alternatively, apparatus 800 may smooth edges between generated pixels and pixels from image 114 and/or image 802.

In some aspects, processor(s) 118 may cause UI 102 to display image 808 at display 104. Additionally or alternatively, processor(s) 118 may analyze image 808 or cause image 808 to be analyzed by one or more other processors. Additionally or alternatively, processor(s) 118 may cause image 808 to be stored (e.g., at a memory) or transmitted for display and/or analysis at a later time or at a different location.

By interpreting user input 110 as a change 116 relative to image 114 and/or image 802 and instructing generative machine-learning model 806 (and/or generative machine-learning model 807) based on change 116, apparatus 800 may provide a user with an easy and convenient way to instruct generative machine-learning model 806 (and/or generative machine-learning model 807) relative to the generation of image 808.

For example, based on a pinch gesture, apparatus 800, through change 116, may instruct generative machine-learning model 806 (and/or generative machine-learning model

807) to generate image content to surround image 114 and/or image 802 in image 808 (e.g., as if image 808 was image 114 or image 802 captured with a wider field of view). An example of generating image content based on expanding a field of view is provided in FIG. 2. The example of FIG. 2 could be implemented by apparatus 800 with the addition of a second input image. As another example, based on a drag gesture, apparatus 800, through change 116, may instruct generative machine-learning model 806 (and/or generative machine-learning model 807) to generate image content on a side of image 114 and/or of image 802 in image 802 (e.g., as if image 802 was image 114 or image 808 captured from a panned field of view). An example of generating image content based on panning a field of view is provided in FIG. 3. The example of FIG. 3 could be implemented by apparatus 800 with the addition of a second input image. As another example, based on a rotating gesture, apparatus 800, through change 116, may instruct generative machine-learning model 806 (and/or generative machine-learning model 807) to generate image content to fill corners of image 808 around a rotated version of image 114 and/or image 802 in image 808 (e.g., as if image 808 was image 114 or image 802 captured from a rotated camera). An example of generating image content based on rotated a field of view is provided in FIG. 4. The example of FIG. 4 could be implemented by apparatus 800 with the addition of a second input image. As another example, based on a rotation of apparatus 800, apparatus 800, through change 116, may instruct generative machine-learning model 806 (and/or generative machine-learning model 807) to generate content to a right and a left side of image 114 and/or of image 802, or above and below image 114 and/or image 802, (e.g., as if image 808 was image 114 or image 802 captured from a camera rotated 90 degrees). An example of generating image content based on rotating a field of view by 90 degrees is provided in FIG. 5. The example of FIG. 5 could be implemented by apparatus 600 with the addition of a second input image.

Figure 9:
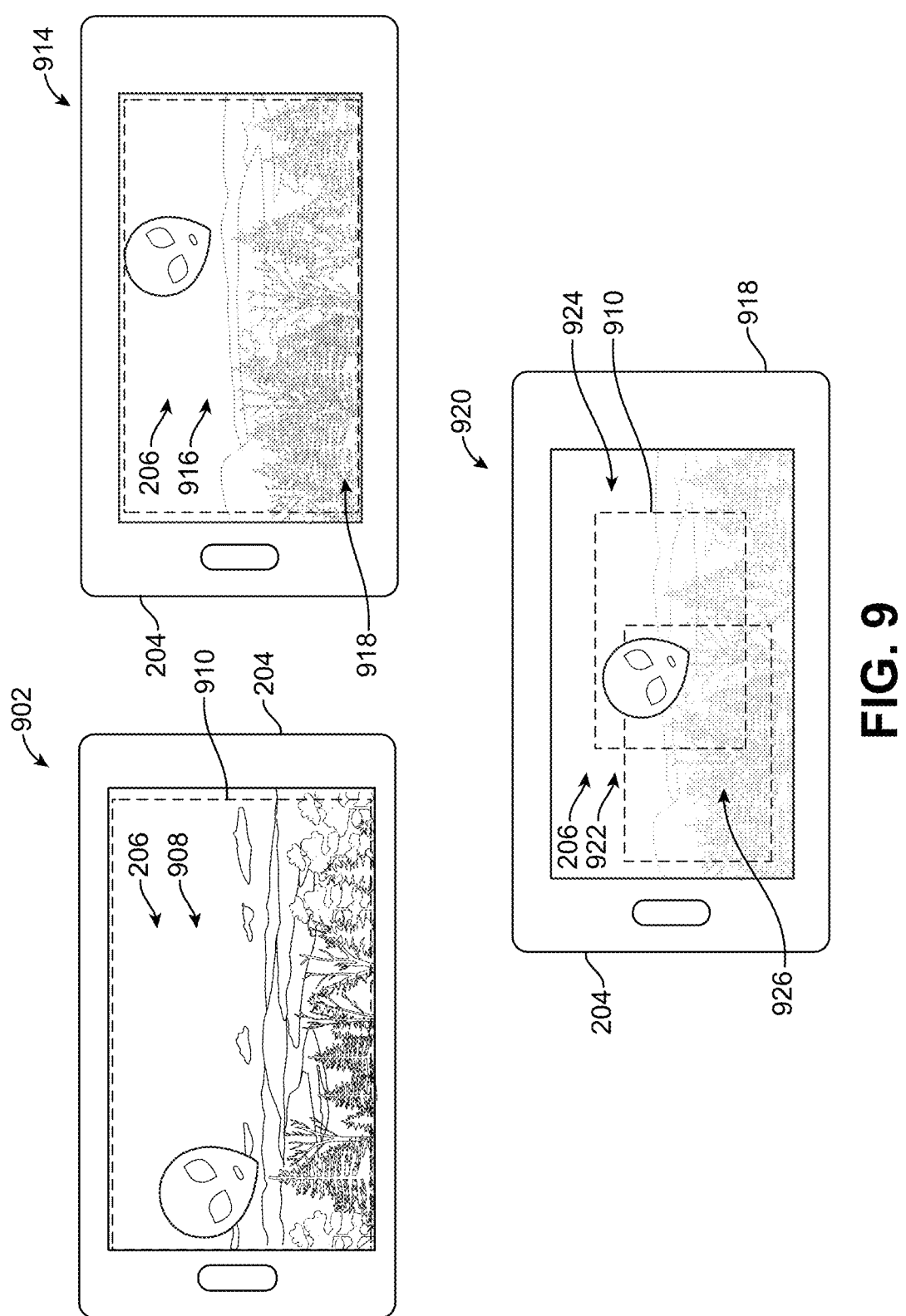
FIG. 9 includes an example representation of an apparatus displaying an image (e.g., which may be captured by a camera of the apparatus at a first time), an example representation of the apparatus displaying another image (e.g., which may be captured by the camera of the apparatus at a second time), and an example representation of the apparatus displaying yet another image (e.g., including generated image content), according to various aspects of the present disclosure.

FIG. 9 includes an example representation 902 of apparatus 204 displaying an image 908 (e.g., which may be captured by a camera of apparatus 204 at a first time), an example representation 914 of apparatus 204 displaying an image 916 (e.g., which may be captured by the camera of apparatus 204 at a second time), and an example representation 920 of apparatus 204 displaying an image 922 (e.g., including generated image content, such as generated pixels 924 and/or modified pixels 926), according to various aspects of the present disclosure. In general, apparatus 204 may implement the systems and techniques by displaying image 908 and/or image 916 (e.g., at separate times, in a split-screen display, or partially overlaid), receiving a user input (e.g., a pinch gesture a drag gesture, a rotate gesture, or a rotation of apparatus 204), and generating image 922 (including generated pixels 924) based on image 908, image 916, and the user input.

For example, representation 902 includes apparatus 204 implementing UI 206, which UI 206 displays image 908. Image 908 may be captured by a camera (e.g., camera 112 of FIG. 8) of apparatus 204 at a first time. Image 908 may be an example of image 114 of FIG. 8. Image 908 may be of a first field of view 910, for example, image 908 may represent field of view 910 of a scene.

Further, representation 914 includes apparatus 204 implementing UI 206, which UI 206 displays image 916. Image 916 may be captured by the camera which captured image 908 (e.g., camera 112) of apparatus 204. Image 916 may be an example of image 802 of FIG. 8. Image 916 may be of a second field of view 918, for example, image 916 may represent field of view 918 of the scene (e.g., the same scene represented by image 908).

UI 206 may receive a user input (e.g., a pinch gesture a drag gesture, a rotate gesture, or a rotation of apparatus 204) and interpret the user input relative to image 908 and/or image 916. The change may be a change to field of view 910 and/or field of view 918. For example, UI 206 may interpret the user input as a desire to change field of view 910 and/or field of view 918, for example, by expanding the field of view 910 and/or field of view 918, panning field of view 910 and/or field of view 918, and/or rotating field of view 910 and/or field of view 918.

Apparatus 204 may provide at least part of image 908 and at least part of image 916 (e.g., as conditions) and instructions based on the change to a generative machine-learning model (e.g., generative machine-learning model 806 and/or generative machine-learning model 807 of FIG. 8) of apparatus 204. For example, based on the desired change to the field of view, apparatus 204 may determine a part of image 908 and/or a part of image 916, for example, excluding a part of image 716 that may be cut from the frame by the panning, and provide the part to the generative machine-learning model. Alternatively, apparatus 204 may provide all of image 708 and/or all of image 716 to the generative machine-learning model. The generative machine-learning model may generate image 922 based on at least part of image 908, at least part of image 916, and the instructions and UI 206 may display image 922 at UI 206 as illustrated in representation 920. Image 922 may include at least part of image 908 of the first field of view 910, at least part of image 916 of the second field of view 918, generated pixels 924 (which may be outside field of view 910 and field of view 918), and/or modified pixels 926. For example, image 922 may include at least part of image 908 of field of view 910, at least part of image 916 of field of view 918, and generated pixels 924 on one or more sides of field of view 910 and/or field of view 918. Additionally or alternatively, image 922 may include modified pixels 926, which may be outside of field of view 910, inside field of view 918, and based on image 916. For example, the generative machine-learning model may generate modified pixels 926 based on image 916. Modified pixels 926 may, or may not, be the same as pixels in image 916. For example, modified pixels 926 may have a different resolution than image 916. Alternatively, modified pixels 926 may be inside field of view 910 of image 908. In such cases, modified pixels 926 may be based on image 908 and/or image 916. Modified pixels 926 may, or may not, be the same as pixels of image 908. For example, modified pixels 926 may have a different resolution than image 908. Additionally or alternatively, apparatus 204 may smooth edges between generated pixels 924 and pixels from image 908 and/or image 916. Image 922 may appear to be image 908 the scene as if image 908 were captured of a different field of view. Additionally or alternatively, image 922 may appear to be image 916 of the scene as if image 916 were captured of a different field of view. In cases in which image 922 includes a part of image 908 and/or a part of 916, the part of image 908 and/or the part of image 916 included in image 922 may be the same the part of image 908 and/or the part of 916 provided by apparatus 204. Alternatively, the part of image 908 and/or the part of image 916 included in image 922 may be a subset of what is provided by apparatus 204. For example, apparatus 204 may provide all of image 908 (or a large part of image 908) and image 922 may include a subset of what was provided.

Figure 10:
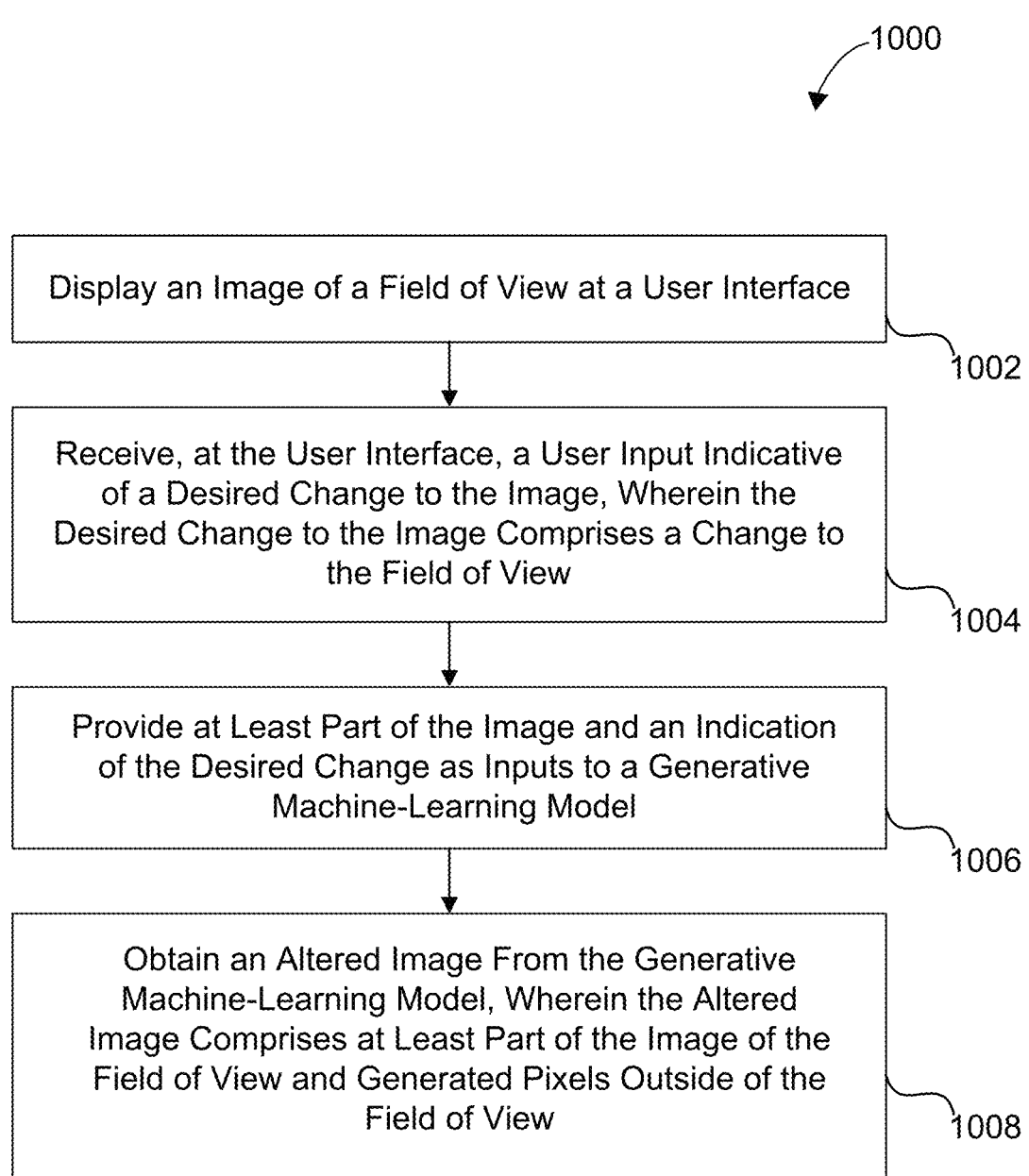
FIG. 10 is a flow diagram illustrating another example process for generating image content, in accordance with aspects of the present disclosure.

FIG. 10 is a flow diagram illustrating a process 1000 for generating image content, in accordance with aspects of the present disclosure. One or more operations of process 1000 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 1000. The one or more operations of process 1000 may be implemented as software components that are executed and run on one or more processors.

At block 1002, a computing device (or one or more components thereof) may display an image of a field of view at a user interface. In some aspects, the computing device (or one or more components thereof) may include the user interface and may display the image of the field of view at the user interface. In other aspects, the computing device (or one or more components thereof) may be in communication with a user interface and may cause the user interface to display the image of the field of view. For example, apparatus 100 of FIG. 1 may display image 208 of field of view 210 at display 104 of UI 102.

At block 1004, the computing device (or one or more components thereof) may receive, at the user interface, a user input indicative of a desired change to the image, wherein the desired change to the image comprises a change to the field of view. In some aspects, the computing device (or one or more components thereof) may include the user interface and may receive the user input indicative of the desired change to the image at the user interface. In other aspects, the computing device (or one or more components thereof) may be in communication with a user interface, the user interface may receive the user input indicative of the desired change to the image and provide the indication to the computing device (or one or more components thereof). For example, apparatus 100 may receive, at UI 102 (e.g., at touch sensor 106, using orientation sensor 108, and/or using camera 109) a user input (e.g., pinch gesture 212, drag gesture 312, rotate gesture 412, or a rotation of apparatus 100). The user input may be indicative of a desired change to view 210 of image 208.

In some aspects, the user interface may interpret a gesture to receive the user input. In some aspects, the user interface may be, or may include, a touch screen configured to sense touches. The user interface may be configured to interpret the touches as the gesture. For example, UI 102 may include touch sensor 106. In some aspects, user interface may be configured to interpret a pinch touch gesture as an indication that the desired change comprises expanding the field of view. For example, UI 102, may sense a pinch gesture using touch sensor 106 and interpret the pinch gesture as an indication of a desire to expand the field of view 210 represented by image 208, for example, as described and illustrated with respect to FIG. 2. In some aspects, user interface may be configured to interpret a drag touch gesture as an indication that the desired change comprises panning to change the field of view. For example, UI 102, may sense a drag gesture using touch sensor 106 and interpret the drag gesture as an indication of a desire to pan the field of view 310 represented by image 308, for example, as described and illustrated with respect to FIG. 3. In some aspects, user interface may be configured to interpret a rotating touch gesture as an indication that the desired change comprises rotating the field of view. For example, UI 102, may sense a rotating gesture using touch sensor 106 and interpret the rotating gesture as an indication of a desire to rotate the field of view 410 represented by image 408, for example, as described and illustrated with respect to FIG. 4.

In some aspects, the user interface may interpret a gesture to receive the user input. In some aspects, the user interface comprises a camera configured to capture images of a user. The user interface may be configured to interpret a pose of the user as the gesture. For example, UI 102 may include camera 109. Camera 109 may capture an image (or images) of a user. UI 102 may track various body parts of the user and interpret gestures based on the tracked body parts. In some aspects, the camera may be, or may include, at least one of: an active-depth camera; an infrared (IR) camera; a red-green-blue (RGB) camera; stereo cameras; or an eye-facing camera. For example, camera 109 may include any or all of an active-depth camera; an infrared (IR) camera; a red-green-blue (RGB) camera; stereo cameras; or an eye-facing camera. In some aspects, the user interface may be configured to interpret at least one of: hand gestures to receive the user input; or eye positions as gestures to receive the user input. For example, UI 102 may be configured to interpret hand gestures and/or eye positions (e.g., gazes, glances, blinks, etc.) as gestures.

In some aspects, the computing device (or one or more components thereof) may include, or be coupled to, an orientation sensor configured to sense an orientation of the apparatus and wherein the user interface is configured to interpret a rotation of the apparatus as an indication that the desired change comprises rotating the field of view. For example, UI 102 of apparatus 100 may include orientation sensor 108 that may determine an orientation (and/or a change in orientation) of apparatus 100. UI 102 may interpret a change in orientation as a desire to rotate the field of view of image 114. In some aspects, the image may displayed by the user interface in a portrait format and the altered image comprises the generated pixels on at least a side of the at least part of the image of the field of view; or the image is displayed by the user interface in a landscape format and the altered image comprises the generated pixels at least one of above or below the at least part of the image of the field of view. For example, UI 206 of apparatus 204 may display image 508 in a portrait format. A user may rotate apparatus 204 and UI 206 may interpret the rotation as a desire to rotate image 508. Accordingly, apparatus 204 may send image 508 along with an indication of a desire to rotate image 508 from a portrait format to a landscape format to a generative machine-learning model. The generative machine-learning model may generate image 516, which may include at least a part of image 508. Apparatus 204 may display image 516 at UI 206. As an example, UI 206 of apparatus 204 may display image 516 in a landscape format. A user may rotate apparatus 204 and UI 206 may interpret the rotation as a desire to rotate image 516. Accordingly, apparatus 204 may send image 516 along with an indication of a desire to rotate image 516 from a landscape format to a portrait format to a generative machine-learning model. The generative machine-learning model may generate image 508, which may include at least a part of image 516. Apparatus 204 may display image 508 at UI 206.

At block 1006, the computing device (or one or more components thereof) may provide at least part of the image and an indication of the desired change as inputs to a generative machine-learning model. In some aspects, the computing device (or one or more components thereof) may implement the generating machine-learning model. In such aspects, the computing device (or one or more components thereof) may provide the at least part of the image and the indication of the desired change as inputs to the generative machine-learning model locally. In other aspects, the computing device (or one or more components thereof) may be in communication with another computing device (or one or more components thereof) that may implement the generative machine-learning model. In such aspects, the computing device (or one or more components thereof) may provide the at least part of the image and the indication of the desired change as inputs to the generative machine-learning model at the other computing device (or one or more components thereof). For example, apparatus 100 may provide at least a part of image 114 (e.g., a part of image 208) and an indication of the desired change (e.g., change 116) to generative machine-learning model 120 and/or to generative machine-learning model 121.

At block 1008, the computing device (or one or more components thereof) may obtain an altered image from the generative machine-learning model, wherein the altered image comprises at least part of the image of the field of view and generated pixels outside of the field of view. In some aspects, the computing device (or one or more components thereof) may implement the generating machine-learning model. In such aspects, the computing device (or one or more components thereof) may obtain the altered image directly from the generative machine-learning model. In other aspects, the computing device (or one or more components thereof) may be in communication with another computing device (or one or more components thereof) that may implement the generative machine-learning model. In such aspects, the computing device (or one or more components thereof) may obtain the altered image from the generative machine-learning model from the other computing device (or one or more components thereof). For example, apparatus 100 may obtain (from generative machine-learning model 120 and/or generative machine-learning model 121) image 122. Image 122 may include at least a part of image 114 of the field of view (e.g., at least a part of image 208 of view 210) and generated pixels (e.g., generated pixels 218) outside the field of view.

In some aspects, the computing device (or one or more components thereof) may display the altered image. For example, the computing device (or one or more components thereof) may cause a user interface to display the altered image. For example, apparatus 204 may display image 216 at UI 206. Additionally or alternatively, the computing device (or one or more components thereof) may cause the altered image to be at least one of: displayed by the user interface, stored at a memory, analyzed, or transmitted. For example, apparatus 100 may cause image 122 to be displayed (e.g., at display 104), stored in a memory (not illustrated in FIG. 1) analyzed (e.g., at processor(s) 118), and/or transmitted (e.g., by a communication interface not illustrated in FIG. 1). Image 122 may be stored or transmitted for display or analysis at another device and/or at another time.

In some aspects, the altered image may be, or may include, the generated pixels on at least two sides of the at least part of the image of the field of view. For example, image 216 includes generated pixels 218 on two sides of image 208 of field of view 210. In some aspects, altered image may be, or may include, the generated pixels on at least one side of the at least part of the image of the field of view. For example, image 316 includes generated pixels 318 on one side of image 308 of field of view 310. In some aspects, the altered image may be, or may include, the generated pixels at at least one corner of the altered image. for example, image 416 includes generated pixels 418 at four corners of image 416.

In some aspects, the computing device (or one or more components thereof) may generate a final image by at least one of rotating or cropping the altered image based on the change to the field of view. For example, apparatus 100 may obtain image 122. Apparatus 100 (using processor(s) 118) may rotate and/or crop image 122 to generate a final image. For example, apparatus 100 may obtain a version of image 408 that is expanded. Apparatus 100 may rotate and crop the expanded image to generate image 416.

In some aspects, the computing device (or one or more components thereof) may at least one of rotate or crop the image to obtain the at least part of the image to provide to the generative machine-learning model. For example, apparatus 100 may obtain image 114 and rotate or crop image 114 before providing image 114 to generative machine-learning model 120 (or generative machine-learning model 121). Apparatus 100 may provide the rotated and/or cropped image 114 to generative machine-learning model 120 (or generative machine-learning model 121). Generative machine-learning model 120 (or generative machine-learning model 121) may generate image 122 based on the rotated and/or cropped version of image 114. For example, apparatus 100 may obtain image 408. Apparatus 100 may rotate image 408, for example, as illustrated in the frame of image 416, and provide the rotated image 408 to the generative machine-learning model. The generative machine-learning model may generate image 416 based on the rotated image 408.

In some aspects, the image may be a first image. The computing device (or one or more components thereof) may obtain the first image from a first camera. The computing device (or one or more components thereof) may obtain a second image from a second camera. The computing device (or one or more components thereof) may provide at least part of the first image and at least part of the second image as inputs to the generative machine-learning model. For example, apparatus 600 may include camera 112 and camera 602. Camera 112 may capture camera 112 and camera 602 may capture image 604. Apparatus 600 may provide at least a part of image 114 and a part of image 604 to generative machine-learning model 606 (and/or generative machine-learning model 607). The generative machine-learning model may generate the altered image based on the at least part of the first image and the at least part of the second image. for example, generative machine-learning model 606 may generate image 608 based on the at least part of image 114 and the at least part of image 604. For example, apparatus 204 may obtain image 708 and image 716 and provide at least a part of image 708 and at least a part of image 716 to a generative machine-learning model. The generative machine-learning model may generate image 722 based on at least a part of image 708 and at least a part of image 716. In some aspects, the first camera may have a first focal length and the second camera may have a second focal length that is different than the first focal length. For example, camera 112 may have a different focal length than camera 602.

In some aspects, the image may be a first image of a scene captured at a first time. The computing device (or one or more components thereof) may obtain a second image. The second image may represent the scene captured at a second time. The computing device (or one or more components thereof) may provide at least part of the first image and at least part of a second image to the generative machine-learning model as inputs. For example, camera 112 may capture image 114 at a first time and image 802 at a second time. Both image 114 and image 802 may represent the same scene. Apparatus 100 may provide at least a part of image 114 and a part of image 802 to generative machine-learning model 806 (or generative machine-learning model 807) as inputs. The generative machine-learning model may generate the altered image based on the at least part of image 114 and the at least part of image 802. For example, apparatus 204 may obtain image 908 and image 916 and provide at least a part of image 908 and at least a part of image 916 to a generative machine-learning model. The generative machine-learning model may generate image 922 based on at least a part of image 908 and at least a part of image 916. In some aspects, the field of view may be a first field of view of the scene; the first image is of the first field of view of the scene; and the second image is of a second field of view of the scene. For example, image 908 may represent a first field of view 910 of a scene. Image 916 may represent a second field of view 918 of the scene.

In some aspects, the computing device (or one or more components thereof) may determine to use the second image based on the desired change to the first image. For example, the computing device (or one or more components thereof) may obtain many images. The computing device (or one or more components thereof) may determine to use the second image based on the first image, the scene, and/or the desired change to the first image. For example, apparatus 800 includes scene determiner 804 that may determine a relationship between the first image and the second image, a relationship between a scene captured by the first image and a scene captured by the second image, and/or a relationship between the first image and the second image based on a change to the first image.

In some aspects, the computing device (or one or more components thereof) may, prior to obtaining the altered image, obtain additional pixels and cause the user interface to display the image of the field of view and the additional pixels outside the field of view; and responsive to obtaining the altered image, cause the user interface to display the altered image. For example, apparatus 204 may provide image 208 and an indication of pinch gesture 212 to a generative machine-learning model. Prior to receiving image 216, apparatus 204 may cause UI 206 to display image 208 of field of view 210 and pixels outside 208 (e.g., where generated pixels 218 are illustrated). In some aspects, the pixels may be obtained from the generative machine-learning model prior to the generative machine-learning model providing generated pixels 218. In some aspects, the additional pixels may be blurry. For example, the additional pixels displayed around image 208 of field of view 210 may be blurry prior to apparatus 204 obtaining generated pixels 218 from the generative machine-learning model.

In some aspects, the computing device (or one or more components thereof) may smooth pixels at edges between the at least part of the image of the field of view and the generated pixels outside the field of view. For example, apparatus 204 may smooth pixels at an edge between image 208 of field of view 210 and generated pixels 218.

In some aspects, the computing device (or one or more components thereof) may implement the generative machine-learning model. For example, apparatus 100 may include generative machine-learning model 120. In some aspects, the computing device (or one or more components thereof) may include a communication interface configured to: transmit at least part of the image and the indication of the desired change to a computing device that implements the generative machine-learning model; and receive the altered image from the computing device. For example, apparatus 100 may include a communication interface (not illustrated in FIG. 1). Further, apparatus 100 may transmit at least a part of image 114 and change 116 to generative machine-learning model 121. Generative machine-learning model 121 may process image 114 according to change 116 to generate image 122 and provide image 122 to apparatus 100.

In some examples, as noted previously, the methods described herein (e.g., process 1000 of FIG. 10, and/or other methods described herein) can be performed, in whole or in part, by a computing device or apparatus. In one example, one or more of the methods can be performed by apparatus 100 of FIG. 1, apparatus 600, of FIG. 6, apparatus 800 of FIG. 8, or by another system or device. In another example, one or more of the methods (e.g., process 1000 of FIG. 10, and/or other methods described herein) can be performed, in whole or in part, by the computing-device architecture 1800 shown in FIG. 18. For instance, a computing device with the computing-device architecture 1800 shown in FIG. 18 can include, or be included in, the components of the apparatus 100, processor(s) 118, apparatus 600, and/or apparatus 800 and can implement the operations of process 1000, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 1000, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1000, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

Figure 11:
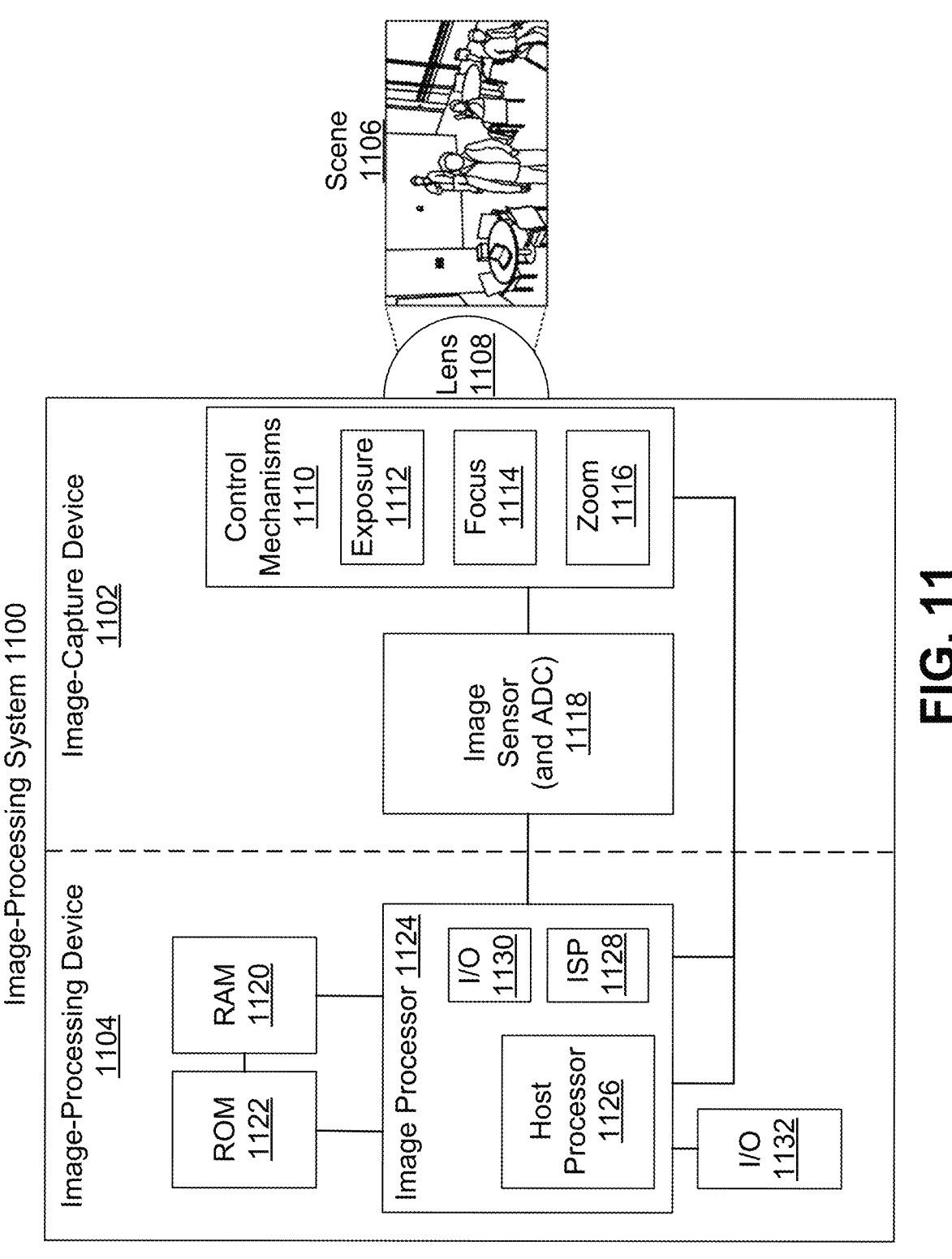
FIG. 11 is a block diagram illustrating an example architecture of an image processing system, according to various aspects of the present disclosure.

FIG. 11 is a block diagram illustrating an example architecture of an image-processing system 1100, according to various aspects of the present disclosure. The image-processing system 1100 includes various components that are used to capture and process images, such as an image of a scene 1106. The image-processing system 1100 can capture image frames (e.g., still images or video frames). In some cases, the lens 1108 and image sensor 1118 (which may include an analog-to-digital converter (ADC)) can be associated with an optical axis. In one illustrative example, the photosensitive area of the image sensor 1118 (e.g., the photodiodes) and the lens 1108 can both be centered on the optical axis.

In some examples, the lens 1108 of the image-processing system 1100 faces a scene 1106 and receives light from the scene 1106. The lens 1108 bends incoming light from the scene toward the image sensor 1118. The light received by the lens 1108 then passes through an aperture of the image-processing system 1100. In some cases, the aperture (e.g., the aperture size) is controlled by one or more control mechanisms 1110. In other cases, the aperture can have a fixed size.

The one or more control mechanisms 1110 can control exposure, focus, and/or zoom based on information from the image sensor 1118 and/or information from the image processor 1124. In some cases, the one or more control mechanisms 1110 can include multiple mechanisms and components. For example, the control mechanisms 1110 can include one or more exposure-control mechanisms 1112, one or more focus-control mechanisms 1114, and/or one or more zoom-control mechanisms 1116. The one or more control mechanisms 1110 may also include additional control mechanisms besides those illustrated in FIG. 11. For example, in some cases, the one or more control mechanisms 1110 can include control mechanisms for controlling analog gain, flash, HDR, depth of field, and/or other image capture properties.

The focus-control mechanism 1114 of the control mechanisms 1110 can obtain a focus setting. In some examples, focus-control mechanism 1114 stores the focus setting in a memory register. Based on the focus setting, the focus-control mechanism 1114 can adjust the position of the lens 1108 relative to the position of the image sensor 1118. For example, based on the focus setting, the focus-control mechanism 1114 can move the lens 1108 closer to the image sensor 1118 or farther from the image sensor 1118 by actuating a motor or servo (or other lens mechanism), thereby adjusting the focus. In some cases, additional lenses may be included in the image-processing system 1100. For example, the image-processing system 1100 can include one or more microlenses over each photodiode of the image sensor 1118. The microlenses can each bend the light received from the lens 1108 toward the corresponding photodiode before the light reaches the photodiode.

In some examples, the focus setting may be determined via contrast detection autofocus (CDAF), phase detection autofocus (PDAF), hybrid autofocus (HAF), or some combination thereof. The focus setting may be determined using the control mechanism 1110, the image sensor 1118, and/or the image processor 1124. The focus setting may be referred to as an image capture setting and/or an image processing setting. In some cases, the lens 1108 can be fixed relative to the image sensor and the focus-control mechanism 1114.

The exposure-control mechanism 1112 of the control mechanisms 1110 can obtain an exposure setting. In some cases, the exposure-control mechanism 1112 stores the exposure setting in a memory register. Based on the exposure setting, the exposure-control mechanism 1112 can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 1118 (e.g., ISO speed or film speed), analog gain applied by the image sensor 1118, or any combination thereof. The exposure setting may be referred to as an image capture setting and/or an image processing setting.

The zoom-control mechanism 1116 of the control mechanisms 1110 can obtain a zoom setting. In some examples, the zoom-control mechanism 1116 stores the zoom setting in a memory register. Based on the zoom setting, the zoom-control mechanism 1116 can control a focal length of an assembly of lens elements (lens assembly) that includes the lens 1108 and one or more additional lenses. For example, the zoom-control mechanism 1116 can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 1108 in some cases) that receives the light from the scene 1106 first, with the light then passing through a focal zoom system between the focusing lens (e.g., lens 1108) and the image sensor 1118 before the light reaches the image sensor 1118. The focal zoom system may, in some cases, include two positive (e.g., converging, convex) lenses of equal or similar focal length (e.g., within a threshold difference of one another) with a negative (e.g., diverging, concave) lens between them. In some cases, the zoom-control mechanism 1116 moves one or more of the lenses in the focal zoom system, such as the negative lens and one or both of the positive lenses. In some cases, zoom-control mechanism 1116 can control the zoom by capturing an image from an image sensor of a plurality of image sensors (e.g., including image sensor 1118) with a zoom corresponding to the zoom setting. For example, the image-processing system 1100 can include a wide-angle image sensor with a relatively low zoom and a telephoto image sensor with a greater zoom. In some cases, based on the selected zoom setting, the zoom-control mechanism 1116 can capture images from a corresponding sensor.

The image sensor 1118 includes one or more arrays of photodiodes or other photosensitive elements. Each photodiode measures an amount of light that eventually corresponds to a particular pixel in the image produced by the image sensor 1118. In some cases, different photodiodes may be covered by different filters. In some cases, different photodiodes can be covered in color filters, and may thus measure light matching the color of the filter covering the photodiode. Various color filter arrays can be used such as, for example and without limitation, a Bayer color filter array, a quad color filter array (QCFA), and/or any other color filter array.

In some cases, the image sensor 1118 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 1118 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 1110 may be included instead or additionally in the image sensor 1118. The image sensor 1118 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 18:
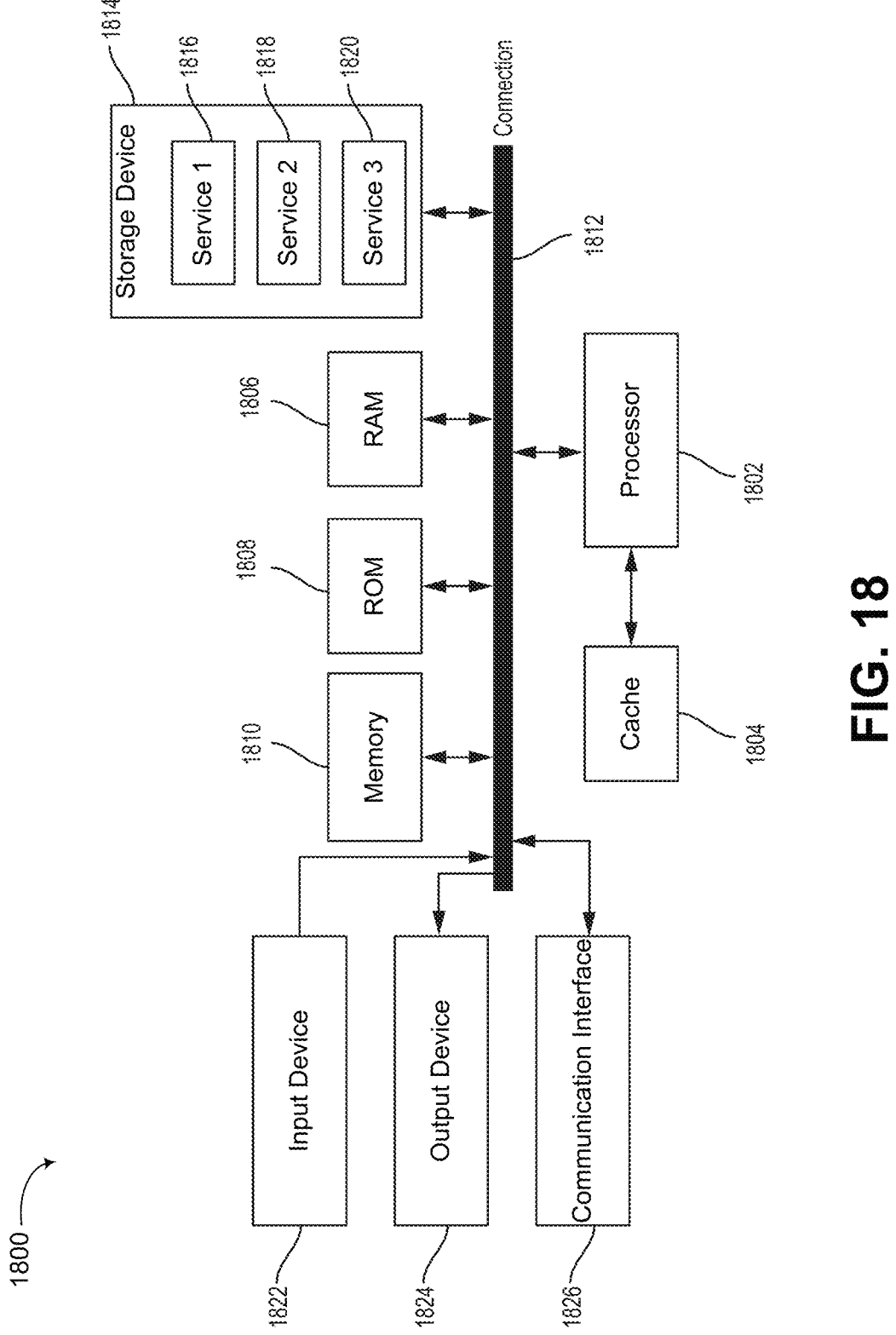
FIG. 18 is a block diagram illustrating an example computing-device architecture of an example computing device which can implement the various techniques described herein.

The image processor 1124 may include one or more processors, such as one or more image signal processors (ISPs) (including ISP 1128), one or more host processors (including host processor 1126), and/or one or more of any other type of processor discussed with respect to the computing-device architecture 1800 of FIG. 18. The host processor 1126 can be a digital signal processor (DSP) and/or other type of processor. In some implementations, the image processor 1124 is a single integrated circuit or chip (e.g., referred to as a system-on-chip or SoC) that includes the host processor 1126 and the ISP 1128. In some cases, the chip can also include one or more input/output ports (e.g., input/output (I/O) ports 1130), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 1130 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General-Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 1126 can communicate with the image sensor 1118 using an I2C port, and the ISP 1128 can communicate with the image sensor 1118 using an MIPI port.

The image processor 1124 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 1124 may store image frames and/or processed images in random-access memory (RAM) 1120, read-only memory (ROM) 1122, a cache, a memory unit, another storage device, or some combination thereof.

Various input/output (I/O) devices 1132 may be connected to the image processor 1124. The I/O devices 1132 can include a display screen, a keyboard, a keypad, a touch-screen, a trackpad, a touch-sensitive surface, a printer, any other output devices, any other input devices, or any combination thereof. In some cases, a caption may be input into the image-processing device 1104 through a physical keyboard or keypad of the I/O devices 1132, or through a virtual keyboard or keypad of a touchscreen of the I/O devices 1132. The I/O devices 1132 may include one or more ports, jacks, or other connectors that enable a wired connection between the image-processing system 1100 and one or more peripheral devices, over which the image-processing system 1100 may receive data from the one or more peripheral device and/or transmit data to the one or more peripheral devices. The I/O devices 1132 may include one or more wireless transceivers that enable a wireless connection between the image-processing system 1100 and one or more peripheral devices, over which the image-processing system 1100 may receive data from the one or more peripheral device and/or transmit data to the one or more peripheral devices. The peripheral devices may include any of the previously-discussed types of the I/O devices 1132 and may themselves be considered I/O devices 1132 once they are coupled to the ports, jacks, wireless transceivers, or other wired and/or wireless connectors.

In some cases, the image-processing system 1100 may be a single device. In some cases, the image-processing system 1100 may be two or more separate devices, including an image-capture device 1102 (e.g., a camera) and an image-processing device 1104 (e.g., a computing device coupled to the camera). In some implementations, the image-capture device 1102 and the image-capture device 1102 may be coupled together, for example via one or more wires, cables, or other electrical connectors, and/or wirelessly via one or more wireless transceivers. In some implementations, the image-capture device 1102 and the image-processing device 1104 may be disconnected from one another.

As shown in FIG. 11, a vertical dashed line divides the image-processing system 1100 of FIG. 11 into two portions that represent the image-capture device 1102 and the image-processing device 1104, respectively. The image-capture device 1102 includes the lens 1108, control mechanisms 1110, and the image sensor 1118. The image-processing device 1104 includes the image processor 1124 (including the ISP 1128 and the host processor 1126), the RAM 1120, the ROM 1122, and the I/O device 1132. In some cases, certain components illustrated in the image-capture device 1102, such as the ISP 1128 and/or the host processor 1126, may be included in the image-capture device 1102. In some examples, the image-processing system 1100 can include one or more wireless transceivers for wireless communications, such as cellular network communications, 802.11 wi-fi communications, wireless local area network (WLAN) communications, or some combination thereof.

The image-processing system 1100 can be part of, or implemented by, a single computing device or multiple computing devices. In some examples, the image-processing system 1100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a game console, an XR device (e.g., an HMD, smart glasses, etc.), an IoT (Internet-of-Things) device, a smart wearable device, a video streaming device, an Internet Protocol (IP) camera, or any other suitable electronic device(s).

While the image-processing system 1100 is shown to include certain components, one of ordinary skill will appreciate that the image-processing system 1100 can include more components than those shown in FIG. 11. The components of the image-processing system 1100 can include software, hardware, or one or more combinations of software and hardware. For example, in some implementations, the components of the image-processing system 1100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image-processing system 1100.

In some examples, the computing-device architecture 1800 shown in FIG. 18 and further described below can include the image-processing system 1100, the image-capture device 1102, the image-processing device 1104, or a combination thereof.

As noted above, various aspects of the present disclosure can use machine-learning models or systems.

Figure 12:
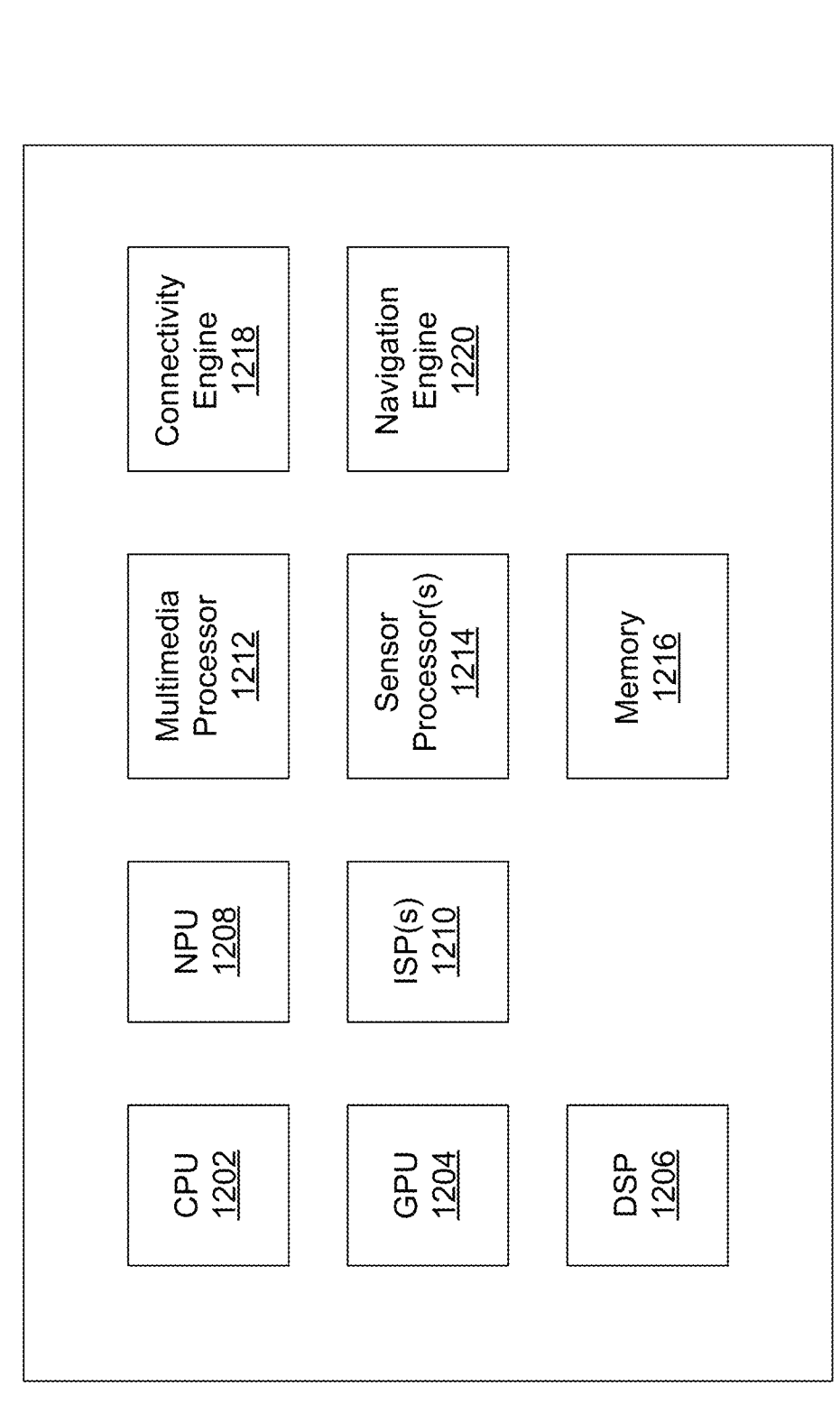
FIG. 12 is a block diagram illustrating an example implementation of a system, which may include a central processing unit (CPU), configured to perform one or more of the functions described herein.

FIG. 12 illustrates an example implementation of a system 1200, which may include a central processing unit (CPU 1202) (which may be a multi-core CPU), configured to perform one or more of the functions described herein. Parameters or variables (e.g., neural signals and synaptic weights), system parameters associated with a computational device (e.g., neural network with weights), task information, among other information may be stored in a memory block associated with a neural processing unit (NPU 1208), in a memory block associated with a CPU 1202, in a memory block associated with a graphics processing unit (GPU 1204), in a memory block associated with a digital signal processor (DSP 1206), in a memory 1216, and/or may be distributed across multiple blocks. Instructions executed at the CPU 1202 may be loaded from a program memory associated with the CPU 1202 or may be loaded from memory 1216.

The system 1200 may also include additional processing blocks tailored to specific functions, such as the GPU 1204, the DSP 1206, a connectivity engine 1218, which may include fifth generation (5G) connectivity, fourth generation long term evolution (4G LTE) connectivity, Wi-Fi connectivity, USB connectivity, Bluetooth connectivity, and the like, and a multimedia processor 1212 that may, for example, detect and recognize gestures. In one implementation, the NPU is implemented in the CPU 1202, the DSP 1206, and/or the GPU 1204. The system 1200 may also include one or more sensor processor(s) 1214, one or more image signal processors (ISP(s) 1210), and/or navigation engine 1220, which may include a global positioning system. In some examples, the sensor processor(s) 1214 can be associated with or connected to one or more sensors for providing sensor input(s) to the sensor processor(s) 1214. For example, the one or more sensors and sensor processor(s) 1214 can be provided in, coupled to, or otherwise associated with a same computing device.

The system 1200 may be implemented as a system on a chip (SoC). The system 1200 may be based on an Advanced Reduced Instruction Set Computer (RISC) Machine (ARM) instruction set. The system 1200 and/or components thereof may be configured to perform machine learning techniques according to aspects of the present disclosure discussed herein. For example, the system 1200 and/or components thereof may be configured to implement a machine-learning model (e.g., a quantized trained machine-learning model) as described herein and/or according to aspects of the present disclosure.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, transformer neural networks, diffusion-based neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 13:
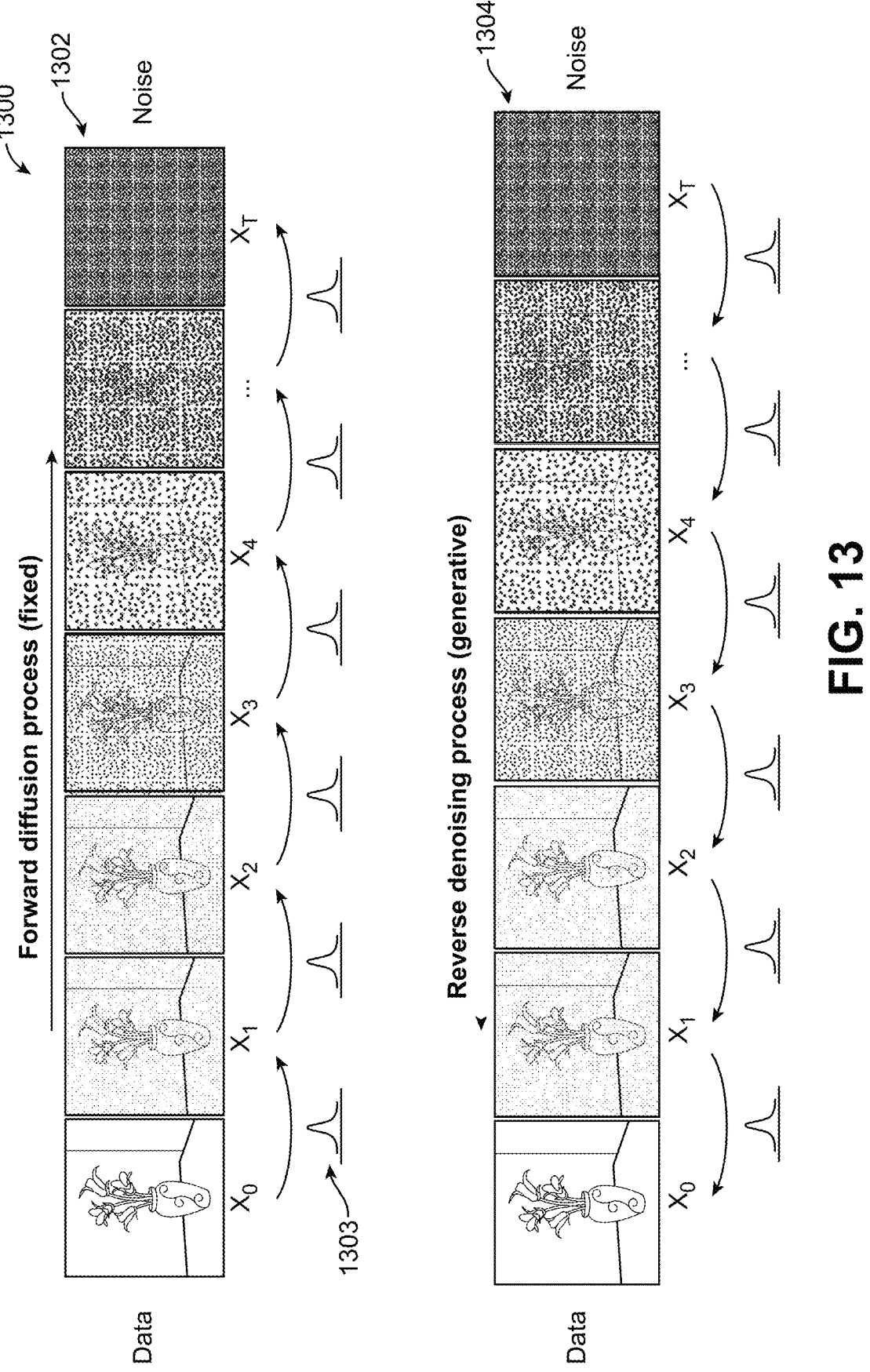
FIG. 13 includes two sets of images that show the forward diffusion process (which is fixed) and the reverse diffusion process (which is learned) of a diffusion model.

FIG. 13 provides two sets of images 1300 that show the forward diffusion process (which is fixed) and the reverse diffusion process (which is learned) of a diffusion model. As shown in the forward diffusion process of FIG. 13, noise 1303 is gradually added to a first set of images 1302 at different time steps for a total of T time steps (e.g., making up a Markov chain), producing a sequence of noisy samples $X_1$ through $X_T$.

Diffusion models from a training perspective will take an image and will slowly add noise to the image to destroy the information in the image. In some aspects, the noise 1303 is Gaussian noise. Each time step can correspond to each consecutive image of the first set of images 1302 shown in FIG. 13. The initial image $X_0$ of FIG. 13 is of a cat. Addition of the noise 1303 to each image (corresponding to noisy samples $X_1$ to $X_T$) results in gradual diffusion of the pixels in each image until the final image (corresponding to sample $X_T$) essentially matches the noise distribution. For example, by adding the noise, each data sample $X_1$ through $X_T$ gradually loses its distinguishable features as the time step becomes larger, eventually resulting in the final sample $X_T$ being equivalent to the target noise distribution, for instance a unit variance zero-Gaussian $\mathcal{N}$ (0,1).

The second set of images 1304 shows the reverse diffusion process in which $X_T$ is the starting point with a noisy image (e.g., one that has Gaussian noise). The diffusion model can be trained to reverse the diffusion process (e.g., by training a model $p_\theta(x_{t-1}|x_t)$) to generate new data. In some aspects, a diffusion model can be trained by finding the reverse Markov transitions that maximize the likelihood of the training data. By traversing backwards along the chain of time steps, the diffusion model can generate the new data. For example, as shown in FIG. 13, the reverse diffusion process proceeds to generate $X_0$ as the image of the cat. In other cases, the input data and output data can vary based on the task for which the diffusion model is trained.

As noted above, the diffusion model is trained to be able to denoise or recover the original image $X_0$ in an incremental process as shown in the second set of images 1304. In some aspects, the neural network of the diffusion model can be trained to recover $X_t$ given $X_{t-1}$, such as provided in the below example equation:

$$q(x_t \mid x_{t-1}) = \mathcal{N}\left(x_t; \sqrt{1-\beta_t}\, x_{t-1}, \beta_t I\right)$$

A diffusion kernel can be defined as:

$$\text{Define } \ \hat{\alpha}_t = \prod\nolimits_{s=1}^{t}(1-\beta_s) \to q(x_t \mid x_0) = \mathcal{N}\left(x_t; \sqrt{\hat{\alpha}_t}\, x_0, (1-\hat{\alpha}_t)I\right)$$

Sampling can be defined as follows:

$$x_t = \sqrt{\hat{\alpha}_t}\, x_0 + \sqrt{1-\hat{\alpha}_t}\,\varepsilon \ \text{ where } \varepsilon \sim \mathcal{N}(0, I).$$

In some cases, the $\beta_t$ values schedule (also referred to as a noise schedule) is designed such that $\hat{\alpha}_T \to 0$ and $q(x_T|x_0) \approx \mathcal{N}(x_T; 0, I)$.

The diffusion model runs in an iterative manner to incrementally generate the input image $X_0$. In one example, the model may have twenty steps. However, in other examples, the number of steps can vary.

Figure 14:
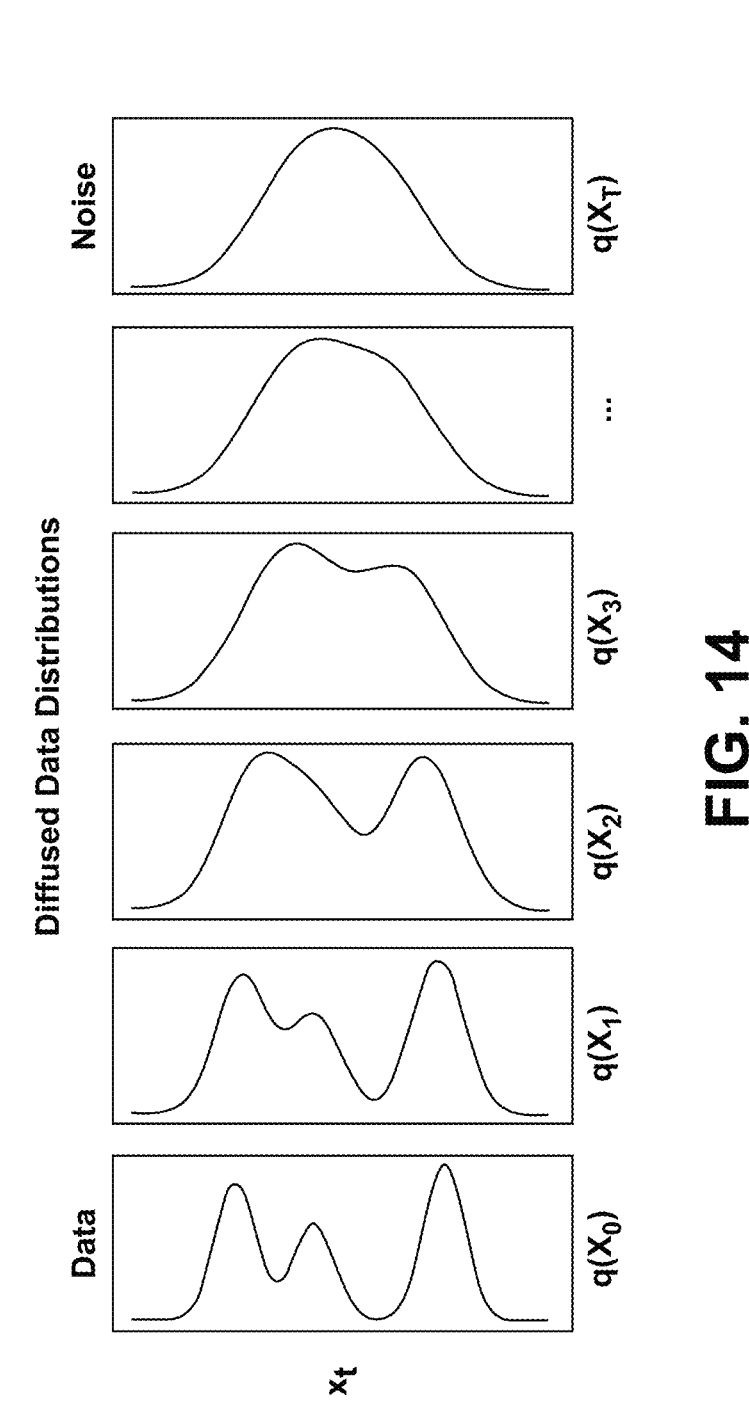
FIG. 14 is a diagram illustrating how diffusion data is distributed from initial data to noise using a diffusion model in the forward diffusion direction, in accordance with some aspects of the present disclosure.

FIG. 14 is a diagram 1400 illustrating how diffusion data is distributed from initial data to noise using a diffusion model in the forward diffusion direction, in accordance with some aspects. Note that the initial data $q(X_0)$ is detailed in the initial stage of the diffusion process. An illustrative example of the data $q(X_0)$ is the initial image of the cat shown in FIG. 13. As the diffusion model iterates and iteratively adds sampled noise to the data from t=0 to t=T, as shown in FIG. 14, the data becomes nosier and may ultimately result in pure noise (e.g., at $q(X_T)$). The example of FIG. 14 illustrates the progression of the data and how it becomes diffused with noise in the forward diffusion process.

In some aspects, the diffused data distribution (e.g., as shown in FIG. 14) can be as follows:

$$q(x_t) = \int q(x_0, x_t)dx_0 = \int q(x_0)q(x_t \mid x_0)dx_0.$$

In the above equation, $q(x_t)$ represents the diffused data distribution, $q(x_0, x_t)$ represents the joint distribution, $q(x_0)$ represents the input data distribution, and $q(x_t|x_0)$ is the diffusion kernel. In this regard, the model can sample $x_t \sim q(x_t)$ by first sampling $x_0 \sim q(x_0)$ and then sampling $x_t \sim q(x_t|x_0)$ (which may be referred to as ancestral sampling). The diffusion kernel takes the input and returns a vector or other data structure as output.

The following is a summary of a training algorithm and a sampling algorithm for a diffusion model. A training algorithm can include the following steps:

1: repeat
2: $x_0 \sim q(x_0)$
3: $t \sim$ Uniform ({1, . . . , T})
4: $\in \sim \mathcal{N}$ (0, I)
5: Take gradient descent step on $$\nabla_\phi \|\in - \in_\phi \left(\sqrt{\hat{\alpha}_t}\, x_0 + \sqrt{1-\hat{\alpha}_t}\,\in, t\right)\|^2$$

6: until converged
6:
A sampling algorithm can include the following steps:
1: $x_T \sim \mathcal{N}$ (0,I)
2: for t=T, . . . , 1 do
3: $z \sim \mathcal{N}$ (0,I)

$$4: x_{t-1} = \frac{1}{\sqrt{\hat{\alpha}_t}}\left(x_t - \frac{1-\hat{\alpha}_t}{\sqrt{1-\hat{\alpha}_t}}\in_\phi (x_t, t)\right) + \sigma_t z$$

5: end for
6: return $x_0$

Figure 15:
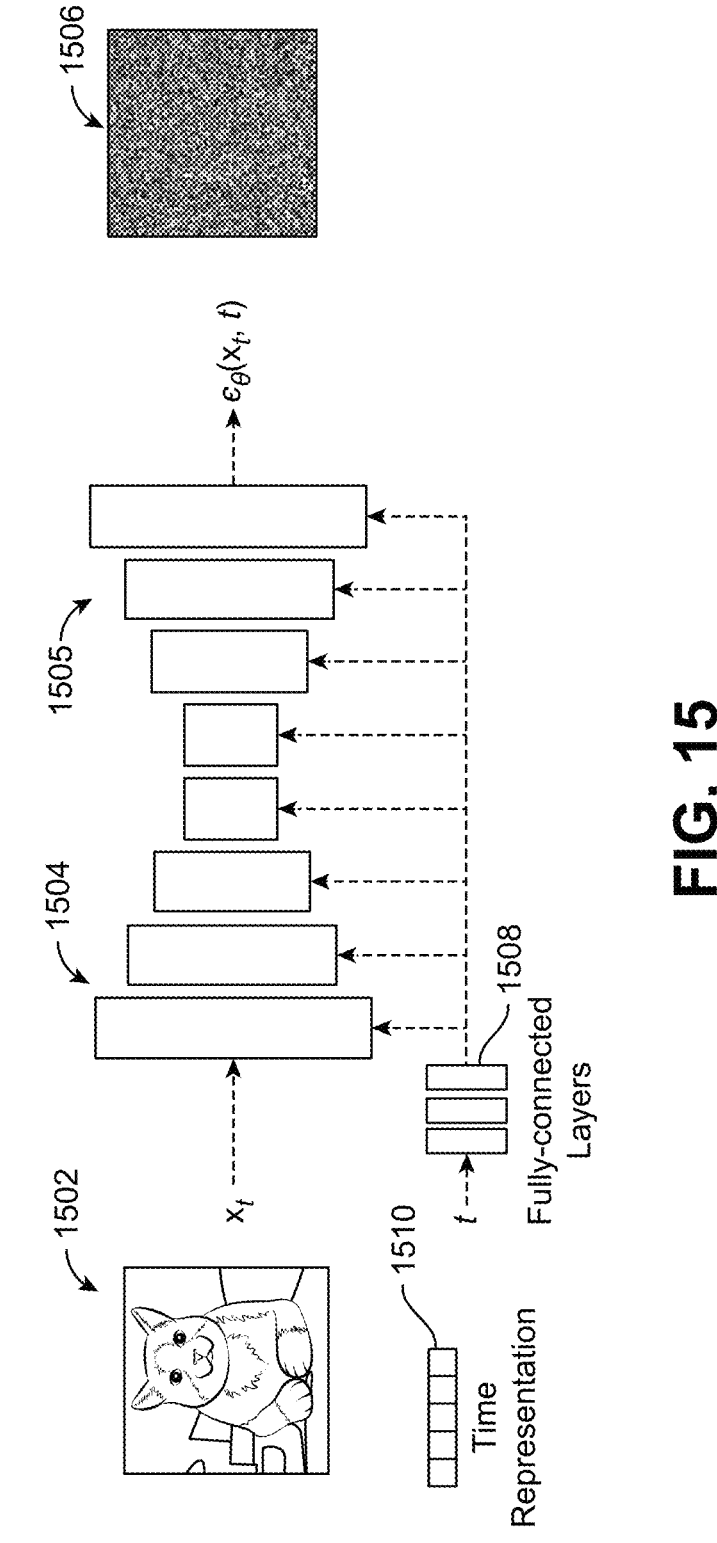
FIG. 15 is a diagram illustrating a U-Net architecture for a diffusion model, in accordance with some aspects of the present disclosure

FIG. 15 is a diagram illustrating a U-Net architecture 1500 for a diffusion model, in accordance with some aspects. The initial image 1502 (e.g., of a cat) is provided to the U-Net architecture 1500 which includes a series of residual networks (ResNet) blocks and self-attention layers to rep-

US 12,671,893 B2

39 resent the network $\varepsilon_\theta$ ($x_t$, t). The U-Net architecture 1500 also includes fully connected layers 1508. In some cases, time representation 1510 can be sinusoidal positional embeddings or random Fourier features. Noisy output 1506 from the forward diffusion process is also shown.

The U-Net architecture 1500 includes a contracting path 1504 and an expansive path 1505 as shown in FIG. 15, which gives it the U-shaped architecture. The contracting path 1504 can be a convolutional network that includes repeated convolutional layers (that apply convolutional operations), each followed by a rectified linear unit (ReLU) and a max pooling operation. When images are being processed (e.g., the image 1502) during the contracting path 1504, the spatial information of the image 1502 is reduced as features are generated. The expansive path 1505 combines the features and spatial information through a sequence of up-convolutions and concatenations with high-resolution features from the contracting path 1504. Some of the layers can be self-attention layers, which leverage global interactions between semantic features at the end of the encoder to explicitly model full contextual information.

Figure 16:
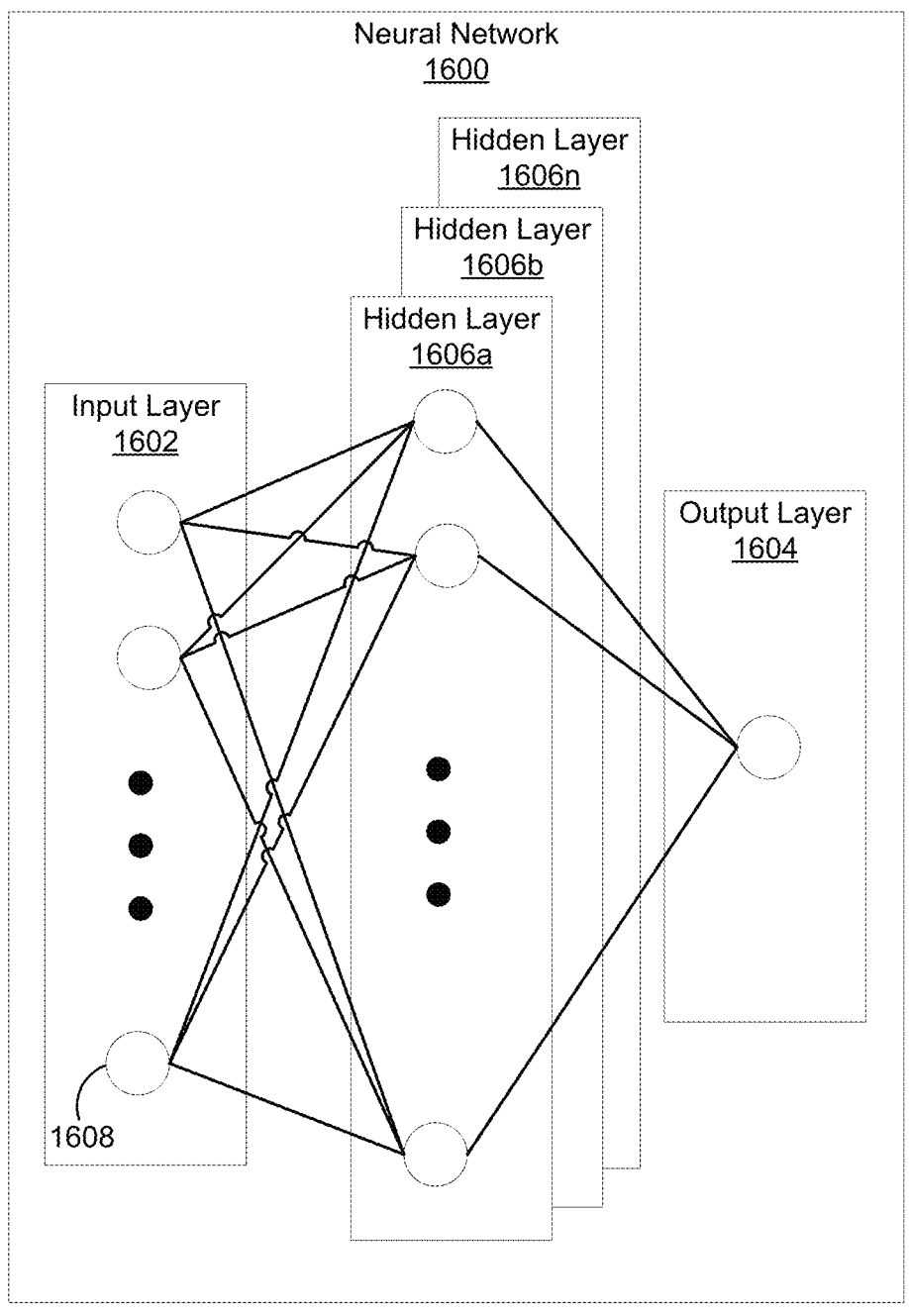
FIG. 16 is a block diagram illustrating an example of a deep learning neural network that can be used to implement a perception module and/or one or more validation modules, according to some aspects of the disclosed technology.

FIG. 16 is an illustrative example of a neural network 1600 (e.g., a deep-learning neural network) that can be used to implement machine-learning-based image generation, feature segmentation, implicit-neural-representation generation, rendering, classification, object detection, image recognition (e.g., face recognition, object recognition, scene recognition, etc.), feature extraction, authentication, gaze detection, gaze prediction, and/or automation. For example, neural network 1600 may be an example of, or can implement, generative machine-learning model 120, generative machine-learning model 121, generative machine-learning model 606, generative machine-learning model 607, generative machine-learning model 806, and/or generative machine-learning model 807.

An input layer 1602 includes input data. In one illustrative example, input layer 1602 can include data representing image 114, image 208, image 308, image 408, image 508, image 604, image 708, image 716, image 802, image 908, and/or image 916. Neural network 1600 includes multiple hidden layers hidden layers 1606a, 1606b, through 1606n. The hidden layers 1606a, 1606b, through hidden layer 1606n include "n" number of hidden layers, where "n" is an integer greater than or equal to one. The number of hidden layers can be made to include as many layers as needed for the given application. Neural network 1600 further includes an output layer 1604 that provides an output resulting from the processing performed by the hidden layers 1606a, 1606b, through 1606n. In one illustrative example, output layer 1604 can provide image 122, image 216, image 316, image 416, image 516, image 608, image 722, image 808, and/or image 922.

Neural network 1600 may be, or may include, a multi-layer neural network of interconnected nodes. Each node can represent a piece of information. Information associated with the nodes is shared among the different layers and each layer retains information as information is processed. In some cases, neural network 1600 can include a feed-forward network, in which case there are no feedback connections where outputs of the network are fed back into itself. In some cases, neural network 1600 can include a recurrent neural network, which can have loops that allow information to be carried across nodes while reading in input.

Information can be exchanged between nodes through node-to-node interconnections between the various layers. Nodes of input layer 1602 can activate a set of nodes in the first hidden layer 1606a. For example, as shown, each of the input nodes of input layer 1602 is connected to each of the nodes of the first hidden layer 1606a. The nodes of first hidden layer 1606a can transform the information of each input node by applying activation functions to the input node information. The information derived from the transformation can then be passed to and can activate the nodes of the next hidden layer 1606b, which can perform their own designated functions. Example functions include convolutional, up-sampling, data transformation, and/or any other suitable functions. The output of the hidden layer 1606b can then activate nodes of the next hidden layer, and so on. The output of the last hidden layer 1606n can activate one or more nodes of the output layer 1604, at which an output is provided. In some cases, while nodes (e.g., node 1608) in neural network 1600 are shown as having multiple output lines, a node has a single output and all lines shown as being output from a node represent the same output value.

In some cases, each node or interconnection between nodes can have a weight that is a set of parameters derived from the training of neural network 1600. Once neural network 1600 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 1600 to be adaptive to inputs and able to learn as more and more data is processed.

Neural network 1600 may be pre-trained to process the features from the data in the input layer 1602 using the different hidden layers 1606a, 1606b, through 1606n in order to provide the output through the output layer 1604. In an example in which neural network 1600 is used to identify features in images, neural network 1600 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 000000].

In some cases, neural network 1600 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until neural network 1600 is trained well enough so that the weights of the layers are accurately tuned.

For the example of identifying objects in images, the forward pass can include passing a training image through neural network 1600. The weights are initially randomized before neural network 1600 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 1600, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 1600 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 1600 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the dl where opposite direction of the gradient. The weight update can be denoted as $w = w_i - \eta dL/dW$, where w denotes a weight, $w_i$ denotes the initial weight, and $\eta$ denotes a learning rate. The learning rate can be set to any suitable value, with a high learning rate including larger weight updates and a lower value indicating smaller weight updates.

Neural network 1600 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 1600 can include any other deep network other than a CNN, such as an autoencoder, a deep belief nets (DBNs), a Recurrent Neural Networks (RNNs), among others.

Figure 17:
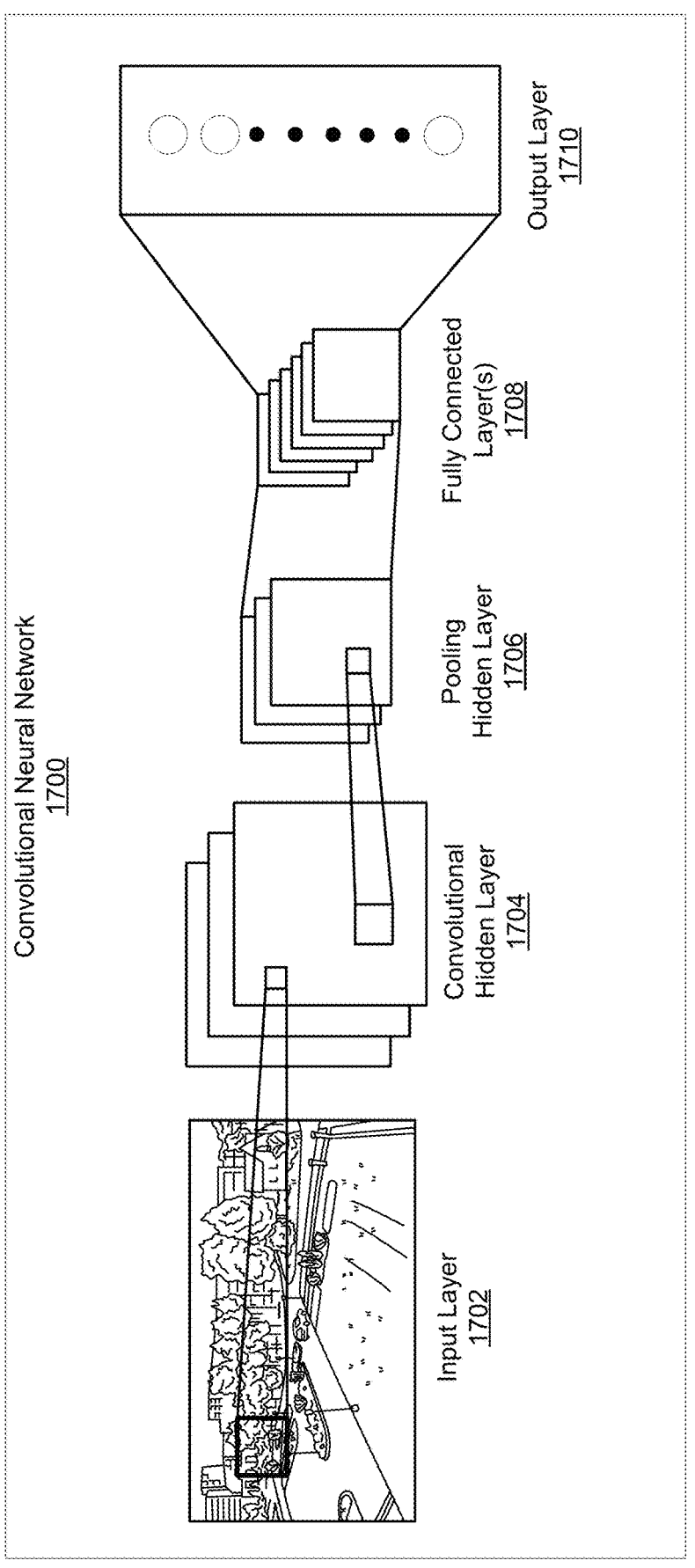
FIG. 17 is a block diagram illustrating an example of a convolutional neural network (CNN), according to various aspects of the present disclosure.

FIG. 17 is an illustrative example of a convolutional neural network (CNN) 1700. The input layer 1702 of the CNN 1700 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1704, an optional non-linear activation layer, a pooling hidden layer 1706, and fully connected layer 1708 (which fully connected layer 1708 can be hidden) to get an output at the output layer 1710. While only one of each hidden layer is shown in FIG. 17, one of ordinary skill will appreciate that multiple convolutional hidden layers, non-linear layers, pooling hidden layers, and/or fully connected layers can be included in the CNN 1700. As previously described, the output can indicate a single class of an object or can include a probability of classes that best describe the object in the image.

The first layer of the CNN 1700 can be the convolutional hidden layer 1704. The convolutional hidden layer 1704 can analyze image data of the input layer 1702. Each node of the convolutional hidden layer 1704 is connected to a region of nodes (pixels) of the input image called a receptive field. The convolutional hidden layer 1704 can be considered as one or more filters (each filter corresponding to a different activation or feature map), with each convolutional iteration of a filter being a node or neuron of the convolutional hidden layer 1704. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1704. Each connection between a node and a receptive field for that node learns a weight and, in some cases, an overall bias such that each node learns to analyze its particular local receptive field in the input image. Each node of the convolutional hidden layer 1704 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 1704 is due to each node of the convolutional layer being applied to its corresponding receptive field. For example, a filter of the convolutional hidden layer 1704 can begin in the top-left corner of the input image array and can convolve around the input image. As noted above, each convolutional iteration of the filter can be considered a node or neuron of the convolutional hidden layer 1704. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1704. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1704.

The mapping from the input layer to the convolutional hidden layer 1704 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1704 can include several activation maps in order to identify multiple features in an image. The example shown in FIG. 17 includes three activation maps. Using three activation maps, the convolutional hidden layer 1704 can detect three different kinds of features, with each feature being detectable across the entire image.

In some examples, a non-linear hidden layer can be applied after the convolutional hidden layer 1704. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1700 without affecting the receptive fields of the convolutional hidden layer 1704.

The pooling hidden layer 1706 can be applied after the convolutional hidden layer 1704 (and after the non-linear hidden layer when used). The pooling hidden layer 1706 is used to simplify the information in the output from the convolutional hidden layer 1704. For example, the pooling hidden layer 1706 can take each activation map output from the convolutional hidden layer 1704 and generates a condensed activation map (or feature map) using a pooling function. Max-pooling is one example of a function performed by a pooling hidden layer. Other forms of pooling functions be used by the pooling hidden layer 1706, such as average pooling, L2-norm pooling, or other suitable pooling functions. A pooling function (e.g., a max-pooling filter, an L2-norm filter, or other suitable pooling filter) is applied to each activation map included in the convolutional hidden layer 1704. In the example shown in FIG. 17, three pooling filters are used for the three activation maps in the convolutional hidden layer 1704.

In some examples, max-pooling can be used by applying a max-pooling filter (e.g., having a size of 2×2) with a stride (e.g., equal to a dimension of the filter, such as a stride of 2) to an activation map output from the convolutional hidden layer 1704. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1704 having a dimension of 24×24 nodes, the output from the pooling hidden layer 1706 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1700.

The final layer of connections in the network is a fully-connected layer that connects every node from the pooling hidden layer 1706 to every one of the output nodes in the output layer 1710. Using the example above, the input layer includes 28×28 nodes encoding the pixel intensities of the input image, the convolutional hidden layer 1704 includes 3×24×24 hidden feature nodes based on application of a 5×5 local receptive field (for the filters) to three activation maps, and the pooling hidden layer 1706 includes a layer of 3×12×12 hidden feature nodes based on application of max-pooling filter to 2×2 regions across each of the three feature maps. Extending this example, the output layer 1710 can include ten output nodes. In such an example, every node of the 3×12×12 pooling hidden layer 1706 is connected to every node of the output layer 1710.

The fully connected layer 1708 can obtain the output of the previous pooling hidden layer 1706 (which should represent the activation maps of high-level features) and determines the features that most correlate to a particular class. For example, the fully connected layer 1708 can determine the high-level features that most strongly correlate to a particular class and can include weights (nodes) for the high-level features. A product can be computed between the weights of the fully connected layer 1708 and the pooling hidden layer 1706 to obtain probabilities for the different classes. For example, if the CNN 1700 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1710 can include an M-dimensional vector (in the prior example, M=10). M indicates the number of classes that the CNN 1700 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 18 illustrates an example computing-device architecture 1800 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1800 may include, implement, or be included in any or all of apparatus 100, apparatus 600, apparatus 800, and/or image-processing system 1100. Additionally or alternatively, computing-device architecture 1800 may be configured to perform process 1000, and/or other process described herein.

The components of computing-device architecture 1800 are shown in electrical communication with each other using connection 1812, such as a bus. The example computing-device architecture 1800 includes a processing unit (CPU or processor) 1802 and computing device connection 1812 that couples various computing device components including computing device memory 1810, such as read only memory (ROM) 1808 and random-access memory (RAM) 1806, to processor 1802.

Computing-device architecture 1800 can include a cache of high-speed memory connected directly with, in close proximity to, or integrated as part of processor 1802. Computing-device architecture 1800 can copy data from memory 1810 and/or the storage device 1814 to cache 1804 for quick access by processor 1802. In this way, the cache can provide a performance boost that avoids processor 1802 delays while waiting for data. These and other modules can control or be configured to control processor 1802 to perform various actions. Other computing device memory 1810 may be available for use as well. Memory 1810 can include multiple different types of memory with different performance characteristics. Processor 1802 can include any general-purpose processor and a hardware or software service, such as service 1 1816, service 2 1818, and service 3 1820 stored in storage device 1814, configured to control processor 1802 as well as a special-purpose processor where software instructions are incorporated into the processor design. Processor 1802 may be a self-contained system, containing multiple cores or processors, a bus, memory controller, cache, etc. A multi-core processor may be symmetric or asymmetric.

To enable user interaction with the computing-device architecture 1800, input device 1822 can represent any number of input mechanisms, such as a microphone for speech, a touch-sensitive screen for gesture or graphical input, keyboard, mouse, motion input, speech and so forth. Output device 1824 can also be one or more of a number of output mechanisms known to those of skill in the art, such as a display, projector, television, speaker device, etc. In some instances, multimodal computing devices can enable a user to provide multiple types of input to communicate with computing-device architecture 1800. Communication interface 1826 can generally govern and manage the user input and computing device output. There is no restriction on operating on any particular hardware arrangement and therefore the basic features here may easily be substituted for improved hardware or firmware arrangements as they are developed.

Storage device 1814 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1806, read only memory (ROM) 1808, and hybrids thereof. Storage device 1814 can include services 1816, 1818, and 1820 for controlling processor 1802. Other hardware or software modules are contemplated. Storage device 1814 can be connected to the computing device connection 1812. In one aspect, a hardware module that performs a particular function can include the software component stored in a computer-readable medium in connection with the necessary hardware components, such as processor 1802, connection 1812, output device 1824, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for generating image content, the apparatus comprising: a user interface configured to: display an image of a field of view; and receive a user input indicative of a desired change to the image, wherein the desired change to the image comprises a change to the field of view; and at least one processor configured to: provide at least part of the image and an indication of the desired change as inputs to a generative machine-learning model; obtain an altered image from the generative machine-learning model, wherein the altered image comprises at least part of the image of the field of view and generated pixels outside of the field of view.

Aspect 2. The apparatus of aspect 1, wherein the user interface is configured to interpret a gesture to receive the user input.

Aspect 3. The apparatus of aspect 2, wherein the user interface comprises a touch screen configured to sense touches and wherein the user interface is configured to interpret the touches as the gesture.

Aspect 4. The apparatus of aspect 3, wherein, the user interface is configured to interpret a pinch touch gesture as an indication that the desired change comprises expanding the field of view.

Aspect 5. The apparatus of any one of aspects 3 or 4, wherein the user interface is configured to interpret a drag touch gesture as an indication that the desired change comprises panning to change the field of view.

Aspect 6. The apparatus of any one of aspects 3 to 5, wherein the user interface is configured to interpret a rotating touch gesture as an indication that the desired change comprises rotating the field of view.

Aspect 7. The apparatus of any one of aspects 2 to 6, wherein the user interface comprises a camera configured to capture images of a user and wherein the user interface is configured to interpret a pose of the user as the gesture.

Aspect 8. The apparatus of aspect 7, wherein the camera comprises at least one of: an active-depth camera; an infra-red (IR) camera; a red-green-blue (RGB) camera; stereo cameras; or an eye-facing camera.

Aspect 9. The apparatus of any one of aspects 7 or 8, wherein the user interface is configured to interpret at least one of: hand gestures to receive the user input; or eye positions as gestures to receive the user input.

Aspect 10. The apparatus of any one of aspects 1 to 9, wherein the altered image comprises the generated pixels on at least two sides of the at least part of the image of the field of view.

Aspect 11. The apparatus of any one of aspects 1 to 10, wherein the altered image comprises the generated pixels on at least one side of the at least part of the image of the field of view.

Aspect 12. The apparatus of any one of aspects 1 to 11, wherein the at least one processor is further configured to generate a final image by at least one of rotating or cropping the altered image based on the change to the field of view.

Aspect 13. The apparatus of any one of aspects 1 to 12, wherein the at least one processor is further configured to at least one of rotate or crop the image to obtain the at least part of the image to provide to the generative machine-learning model.

Aspect 14. The apparatus of any one of aspects 1 to 13, wherein: the image comprises a first image; the apparatus further comprises a first camera configured to capture the first image; the apparatus further comprises a second camera configured to capture a second image; and the at least one processor is configured to provide at least part of the first image and at least part of the second image as inputs to the generative machine-learning model.

Aspect 15. The apparatus of aspect 14, wherein the first camera has a first focal length and the second camera has a second focal length that is different than the first focal length.

Aspect 16. The apparatus of any one of aspects 1 to 15, wherein: the image comprises a first image of a scene captured at a first time; and the at least one processor is further configured to provide at least part of the first image and at least part of a second image of the scene captured at a second time as inputs to the generative machine-learning model.

Aspect 17. The apparatus of aspect 16, wherein: the field of view comprises a first field of view of the scene; the first image is of the first field of view of the scene; and the second image is of a second field of view of the scene.

Aspect 18. The apparatus of any one of aspects 16 or 17, wherein the at least one processor is further configured to determine to use the second image based on the desired change to the first image.

Aspect 19. The apparatus of any one of aspects 1 to 18, wherein: prior to the at least one processor obtaining the altered image the at least one processor is configured to obtain additional pixels and cause the user interface to display the image of the field of view and the additional pixels outside the field of view; and responsive to the at least one processor obtaining the altered image, the at least one processor is configured to cause the user interface to display the altered image.

Aspect 20. The apparatus of aspect 19, wherein the additional pixels are blurry.

Aspect 21. The apparatus of any one of aspects 1 to 20, wherein the user interface is further configured to display the altered image.

Aspect 22. The apparatus of any one of aspects 1 to 21, wherein the at least one processor is further configured to cause the altered image to be at least one of: displayed by the user interface, stored at a memory, analyzed, or transmitted.

Aspect 23. The apparatus of any one of aspects 1 to 22, wherein the at least one processor is further configured to smooth pixels at edges between the at least part of the image of the field of view and the generated pixels outside the field of view.

Aspect 24. The apparatus of any one of aspects 1 to 23, wherein the at least one processor implements the generative machine-learning model.

Aspect 25. The apparatus of any one of aspects 1 to 24, further comprising a communication interface configured to: transmit at least part of the image and the indication of the desired change to a computing device that implements the generative machine-learning model; and receive the altered image from the computing device.

Aspect 26. The apparatus of any one of aspects 1 to 25, wherein the apparatus further comprises an orientation sensor configured to sense an orientation of the apparatus and wherein the user interface is configured to interpret a rotation of the apparatus as an indication that the desired change comprises rotating the field of view.

Aspect 27. The apparatus of any one of aspects 1 to 26, wherein one of: the image is displayed by the user interface in a portrait format and the altered image comprises the generated pixels on at least a side of the at least part of the image of the field of view; or the image is displayed by the user interface in a landscape format and the altered image comprises the generated pixels at least one of above or below the at least part of the image of the field of view.

Aspect 28. The apparatus of any one of aspects 1 to 27, wherein the altered image comprises the generated pixels at at least one corner of the altered image.

Aspect 29. A method comprising for generating image content, the method comprising: displaying an image of a field of view at a user interface; receiving, at the user interface, a user input indicative of a desired change to the image, wherein the desired change to the image comprises a change to the field of view; providing at least part of the image and an indication of the desired change as inputs to a generative machine-learning model; and obtaining an altered image from the generative machine-learning model, wherein the altered image comprises at least part of the image of the field of view and generated pixels outside of the field of view.

Aspect 30. The method of aspect 29, wherein receiving the user input comprises interpreting, as the user input, at least one of: a touch gesture; a hand gesture; or an eye position.

Aspect 31. The apparatus of any one of aspects 1 to 28, wherein: the user input is indicative of two or more desired changes to the field of view of the image; and the at least one processor is configured to provide an indication of the two or more desired changes to the generative machine-learning model.

Aspect 32. The apparatus of any one of aspects 1 to 28 or 31, wherein: the user input is indicative of two or more desired changes to the field of view of the image; and the at least one processor is configured to provide two or more indications of the two or more respective desired changes to the generative machine-learning model.

Aspect 33. A non-transitory computer-readable storage medium having stored thereon instructions that, when executed by at least one processor, cause the at least one processor to perform operations according to any of aspects 29 to 30.

Aspect 34. An apparatus for providing virtual content for display, the apparatus comprising one or more means for perform operations according to any of aspects 29 to 30.

What is claimed is:

1. An apparatus for generating image content, the apparatus comprising:
 a user interface comprising a touch screen, the user interface configured to:
  display an image of a field of view; and
  receive a touch input indicative of a desired change to the image, wherein the desired change to the image comprises a change to the field of view from the field of view to a changed field of view, wherein the changed field of view comprises a portion outside the field of view; and
 at least one processor configured to:
  provide at least part of the image and an indication of the desired change as inputs to a generative machine-learning model;
  obtain an altered image from the generative machine-learning model, wherein the altered image comprises at least part of the image of the field of view and additional pixel data representing the portion outside the field of view.

2. The apparatus of claim 1, wherein the user interface is configured to interpret a gesture to receive the touch input.

3. The apparatus of claim 2, wherein the user interface is configured to interpret the touch input as the gesture.

4. The apparatus of claim 3, wherein, the user interface is configured to interpret a pinch touch gesture as an indication that the desired change comprises expanding the field of view.

5. The apparatus of claim 3, wherein the user interface is configured to interpret a drag touch gesture as an indication that the desired change comprises panning to change the field of view.

6. The apparatus of claim 3, wherein the user interface is configured to interpret a rotating touch gesture as an indication that the desired change comprises rotating the field of view.

7. The apparatus of claim 2, wherein the user interface comprises a camera configured to capture images of a user and wherein the user interface is configured to interpret a pose of the user as the gesture.

8. The apparatus of claim 7, wherein the camera comprises at least one of:
 an active-depth camera;
 an infrared (IR) camera;
 a red-green-blue (RGB) camera;
 stereo cameras; or
 an eye-facing camera.

9. The apparatus of claim 1, wherein the altered image comprises the additional pixel data on at least two sides of the at least part of the image of the field of view.

10. The apparatus of claim 1, wherein the altered image comprises the additional pixel data on at least one side of the at least part of the image of the field of view.

11. The apparatus of claim 1, wherein the at least one processor is further configured to generate a final image by at least one of rotating or cropping the altered image based on the change to the field of view.

12. The apparatus of claim 1, wherein the at least one processor is further configured to at least one of rotate or crop the image to obtain the at least part of the image to provide to the generative machine-learning model.

13. The apparatus of claim 1, wherein:
 the image comprises a first image;
 the apparatus further comprises a first camera configured to capture the first image;
 the apparatus further comprises a second camera configured to capture a second image; and
 the at least one processor is configured to provide at least part of the first image and at least part of the second image as inputs to the generative machine-learning model.

14. The apparatus of claim 13, wherein the first camera has a first focal length and the second camera has a second focal length that is different than the first focal length.

15. The apparatus of claim 1, wherein:
 the image comprises a first image of a scene captured at a first time; and
 the at least one processor is further configured to provide at least part of the first image and at least part of a second image of the scene captured at a second time as inputs to the generative machine-learning model.

16. The apparatus of claim 15, wherein:
 the field of view comprises a first field of view of the scene;
 the first image is of the first field of view of the scene; and
 the second image is of a second field of view of the scene.

17. The apparatus of claim 15, wherein the at least one processor is further configured to determine to use the second image based on the desired change to the first image.

18. The apparatus of claim 1, wherein:
 prior to the at least one processor obtaining the altered image the at least one processor is configured to obtain additional pixels and cause the user interface to display the image of the field of view and the additional pixels outside the field of view; and
 responsive to the at least one processor obtaining the altered image, the at least one processor is configured to cause the user interface to display the altered image.

19. The apparatus of claim 18, wherein the additional pixels are blurry.

20. The apparatus of claim 1, wherein the user interface is further configured to display the altered image.

21. The apparatus of claim 1, wherein the at least one processor is further configured to cause the altered image to be at least one of: displayed by the user interface, stored at a memory, analyzed, or transmitted.

22. The apparatus of claim 1, wherein the at least one processor is further configured to smooth pixels at edges between the at least part of the image of the field of view and the additional pixel data outside the field of view.

23. The apparatus of claim 1, wherein the at least one processor implements the generative machine-learning model.

24. The apparatus of claim 1, further comprising a communication interface configured to:
 transmit at least part of the image and the indication of the desired change to a computing device that implements the generative machine-learning model; and
 receive the altered image from the computing device.

25. The apparatus of claim 1, wherein the apparatus further comprises an orientation sensor configured to sense an orientation of the apparatus and wherein the user interface is configured to interpret a rotation of the apparatus as an indication that the desired change comprises rotating the field of view.

26. The apparatus of claim 1, wherein one of:

the image is displayed by the user interface in a portrait format and the altered image comprises the additional pixel data on at least a side of the at least part of the image of the field of view; or the image is displayed by the user interface in a landscape format and the altered image comprises the additional pixel data at least one of above or below the at least part of the image of the field of view.

27. The apparatus of claim 1, wherein the altered image comprises the additional pixel data at at least one corner of the altered image.

28. A method comprising for generating image content, the method comprising:

displaying an image of a field of view at a touch screen of a user interface;

receiving, at the user interface, a touch input indicative of a desired change to the image, wherein the desired change to the image comprises a change to the field of view from the field of view to a changed field of view, wherein the changed field of view comprises a portion outside the field of view;

providing at least part of the image and an indication of the desired change as inputs to a generative machine-learning model; and obtaining an altered image from the generative machine-learning model, wherein the altered image comprises at least part of the image of the field of view and additional pixel data representing the portion outside the field of view.

\* \* \* \* \*